(12) United States Patent
Itoh et al.

(10) Patent No.: US 8,807,881 B2
(45) Date of Patent: Aug. 19, 2014

(54) THROWAWAY ROTARY CUTTING TOOL

(75) Inventors: Tasuku Itoh, Toyokawa (JP); Yasuo Hamatake, Toyokawa (JP); Katsutoshi Watanabe, Toyokawa (JP)

(73) Assignee: OSG Corporation, Toyokawa-shi (JP)

( * ) Notice: Subject to any disclaimer, the term of this patent is extended or adjusted under 35 U.S.C. 154(b) by 535 days.

(21) Appl. No.: 12/999,427

(22) PCT Filed: Aug. 29, 2008

(86) PCT No.: PCT/JP2008/065595
§ 371 (c)(1),
(2), (4) Date: Dec. 16, 2010

(87) PCT Pub. No.: WO2010/023761
PCT Pub. Date: Mar. 4, 2010

(65) Prior Publication Data
US 2011/0091297 A1   Apr. 21, 2011

(30) Foreign Application Priority Data

Aug. 29, 2008   (JP) ................... 2008/065595

(51) Int. Cl.
*B23C 5/20* (2006.01)
*B23C 5/10* (2006.01)
*B23C 3/30* (2006.01)

(52) U.S. Cl.
CPC ........... *B23C 5/109* (2013.01); *B23C 2210/285* (2013.01); *B23C 2210/086* (2013.01); *B23C 3/30* (2013.01); *B23C 2220/366* (2013.01); *B23C 2220/60* (2013.01)
USPC ............ 407/42; 407/55; 407/60; 407/61

(58) Field of Classification Search
USPC ............... 407/34, 42, 51, 57, 58, 61, 33, 60; 408/224, 223
See application file for complete search history.

(56) References Cited

U.S. PATENT DOCUMENTS

| 4,844,666 A | 7/1989 | Tsujimura et al. |
| 5,017,055 A * | 5/1991 | Tsujimura et al. ............ 407/113 |

(Continued)

FOREIGN PATENT DOCUMENTS

| CN | 1133216 A | 10/1996 |
| CN | 2801351 Y | 8/2006 |

(Continued)

OTHER PUBLICATIONS

International Search Report dated Dec. 2, 2008 in corresponding International Patent Application No. PCT/JP2008/065595 (with translation).

(Continued)

*Primary Examiner* — Andrea Wellington
*Assistant Examiner* — Michael Vitale
(74) *Attorney, Agent, or Firm* — Oliff PLC

(57) ABSTRACT

In a semi-finishing cutter, rectangular tips and square tips are disposed in a staggered pattern in an axial direction in second to fourth step portions, so a single cutting edge is formed by a pair of one of the rectangular tips and one of the square tips. It is therefore possible to effectively reduce a frequency of contact with a blade root. A cutting speed of the semi-finishing cutter may be increased and a cutting feed may be made faster, so work in a semi-finishing process may be performed efficiently. The rectangular tips and the square tips have simple shapes, so known commercially available throwaway tips may be used. Accordingly, it is possible to provide the semi-finishing cutter in an easy-to-use form without increasing the cost.

4 Claims, 18 Drawing Sheets

(56) References Cited

U.S. PATENT DOCUMENTS

| | | | |
|---|---|---|---|
| 5,597,268 A | 1/1997 | Izumi | |
| 5,904,449 A | * 5/1999 | Satran et al. | 407/59 |
| 5,931,616 A | 8/1999 | Daub | |
| 6,164,877 A | 12/2000 | Kamata et al. | |
| 6,322,296 B1 | 11/2001 | Wetli et al. | |
| 7,399,146 B2 | 7/2008 | Long, II et al. | |
| 2003/0138301 A1 | 7/2003 | Kuerzel | |

FOREIGN PATENT DOCUMENTS

| | | | | |
|---|---|---|---|---|
| CN | 201073705 Y | | 6/2008 | |
| CN | 201079861 Y | * | 7/2008 | B23C 5/02 |
| CN | 201143571 Y | | 11/2008 | |
| JP | U-62-178015 | | 11/1987 | |
| JP | A-4-97607 | | 8/1992 | |
| JP | A-8-1426 | | 1/1996 | |
| JP | 08155722 A | * | 6/1996 | B23C 5/02 |
| JP | A-10-006122 | | 1/1998 | |
| JP | A-11-267916 | | 10/1999 | |
| JP | A-11-320234 | | 11/1999 | |
| JP | A-2000-254812 | | 9/2000 | |
| JP | 2003019619 A | * | 1/2003 | B23C 5/10 |
| JP | A-2003-266231 | | 9/2003 | |
| JP | A-2004-507369 | | 3/2004 | |
| JP | A-2005-169513 | | 6/2005 | |
| JP | A-2007-30080 | | 2/2007 | |
| JP | A-2007-175830 | | 7/2007 | |
| WO | WO 01/96055 A1 | | 12/2001 | |

OTHER PUBLICATIONS

Feb. 17, 2009 International Search Report for PCT/JP2008/070650 (with translation).
Itoh, Tasuku et al., U.S. Appl. No. 12/999,811, filed Dec. 17, 2010.
Apr. 2, 2013 Office Action issued in U.S. Appl. No. 12/999,811.
Translation of Apr. 12, 2011 International Preliminary Report on Patentability for International Application No. PCT/JP2008/065595.
International Report on Patentability issued in corresponding Application No. PCT/JP2008/070650 on Jun. 21, 2011.
Aug. 29, 2012 Office Action issued in Chinese Patent Application No. 200880130507.1 (with translation).
Jan. 16, 2014 Notice of Allowance issued in U.S. Appl. No. 12/999,811.
Feb. 19, 2014 Office Action issued in Chinese Patent Application No. 200880130506.7 (with translation).
Oct. 10, 2013 Office Action issued in U.S. Appl. No. 12/999,811.
Sep. 18, 2013 Office Action issued in Chinese Patent Application No. 200880130506.7 (with English-language translation).

* cited by examiner

THROWAWAY ROTARY CUTTING TOOL

TECHNICAL FIELD

The present disclosure relates to a throwaway rotary cutting tool, and more specifically relates to a throwaway rotary cutting tool for cutting a blade root of a turbine blade that is to be mounted on the outer circumference of a rotor.

BACKGROUND ART

In a case where a known turbine blade for a generator is manufactured, the contour of a blade root of the turbine blade must match the shape of a Christmas tree-shaped slot that is formed in the outer circumference of a rotor so that the blade root may be mounted into the slot. The blade root is generally bilaterally symmetrical with respect to its own longitudinal direction, is machined such that the blade root gradually becomes narrower towards its tip, in an upside-down Christmas tree shape in which the width of the root increases and decreases, and is formed such that narrow portions where the root width becomes less alternate with wide portions where the root width becomes greater.

In order to machine the side faces of this sort of blade root in a single pass, for example, a cutting tool of what is called a throwaway type is known in which a tool body that is formed into an upside-down Christmas tree shape is provided and cutting tips may be fastened into a plurality of cutting tip seats that are formed in the tool body (refer to Patent Document 1, for example). This type of cutting tool reduces the volume of discarded tools and is economical, because only the cutting tips may be replaced, while the tool body continues to be used.

Patent Document 1: Japanese Laid-Open Patent Publication No. 2000-254812

However, with the cutting tool that is described in the Patent Document 1, rough cutting of the complex blade root is done by a single tool, so a heavy load bears on the tool, and in particular, the portions of the tool that are narrower in the radial direction are weaker than other portions. Therefore, vibration and chatter noise may occur during the machining. Moreover, in a case where the machining is continued in this sort of unstable state, the tool may break, particularly in the narrower portions, so the machining must be done while limiting the cutting feed of the tool, accordingly efficient machining may not be done. Furthermore, the shapes of the cutting tips must be matched to the contour of the blade root, so ordinary rectangular cutting tips that are commercially available may not be used. Therefore, the cost of manufacturing the cutting tips may be expensive.

DISCLOSURE OF THE INVENTION

The present disclosure is made to solve the problems that are described above, and it is an object of the present disclosure to provide a throwaway rotary cutting tool that can machine a blade root of a turbine blade efficiently and stably.

The present disclosure provides a throwaway rotary cutting tool for performing semi-finishing of a blade root of a turbine blade that is to be mounted on an outer circumference of a rotor, the blade root being machined such that the blade root is bilaterally symmetrical with respect to a longitudinal direction of the blade root and the blade root gradually becomes narrower towards a tip end in an upside-down Christmas tree shape in which a width of the blade root increases and decreases, and the blade root alternately including each of narrow portions where the width becomes less and a wide portion where the width becomes greater, characterized in that the throwaway rotary cutting tool includes a tool body that rotates about an axis, that is formed such that a diameter becomes narrower in a stepped manner towards a tip end in an axial direction, and that includes on a side face of the tool body a plurality of step portions that correspond in number to the narrow portions that are formed on the blade root, first tip seats that are at least even in number, and that are provided as recessed areas on an outer circumference of and in a circumferential direction of a step portion at a tip end side of the tool body in the axial direction, and second tip seats that are at least even in number, that are provided as recessed areas in a staggered pattern in the axial direction, and that are formed on an outer circumference of and in a circumferential direction of a step portion that is disposed farther toward a back end than the step portion at the tip end side of the tool body, a first tip that have a pair of parallel straight sides and circular arcs that join the pair of parallel straight sides to one another at both ends is fitted into at least one of the first tip seats, and fastened, a second tip that is rectangular and a third tip that is rectangular are fitted into the second tip seats alternately in the circumferential direction of the tool body, and fastened, when a planned shape into which the blade root will be formed is viewed in a cross section along the longitudinal direction, the narrow portion that is formed farthest toward the back end of the blade root is cut by a circular arc portion of the first tip and by a side that is continuous with one end of the circular arc portion, the narrow portion of the blade root is cut by a corner portion of the second tip, and an area between the narrow portions is cut by a side of the third tip.

BEST MODE FOR CARRYING OUT THE INVENTION

Figure 1:
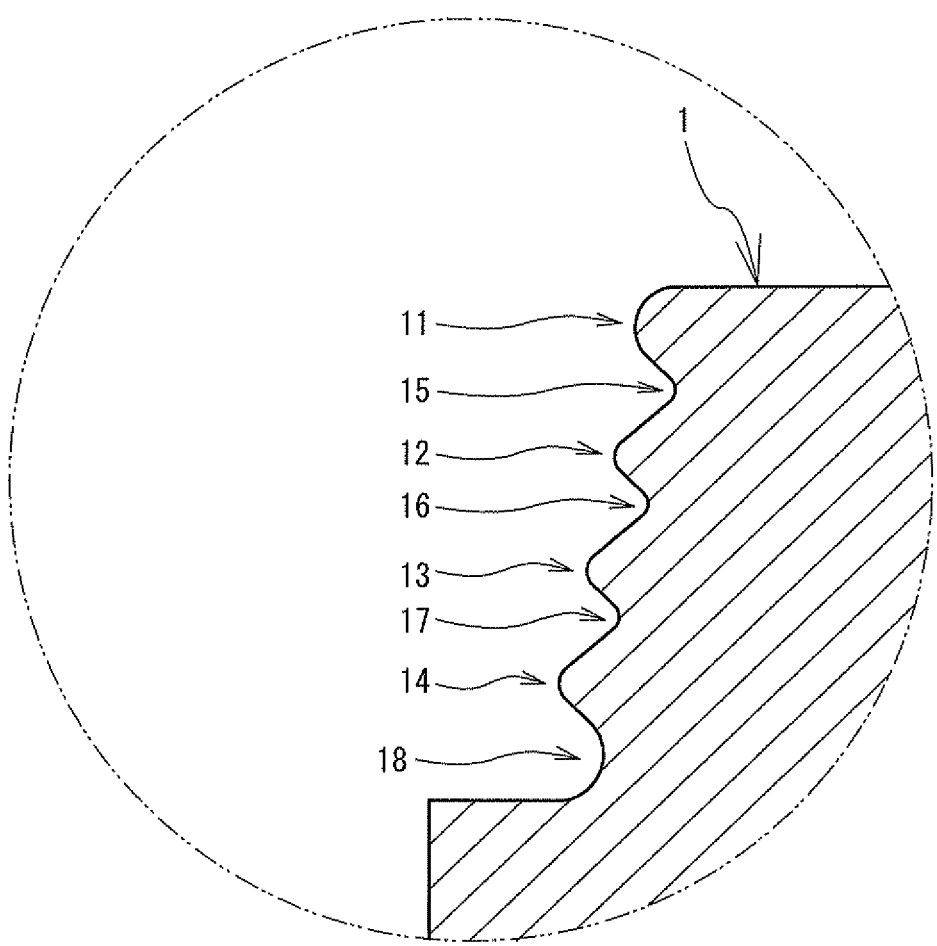
FIG. 1 is a partial sectional view of a blade root 1.
Figure 12:
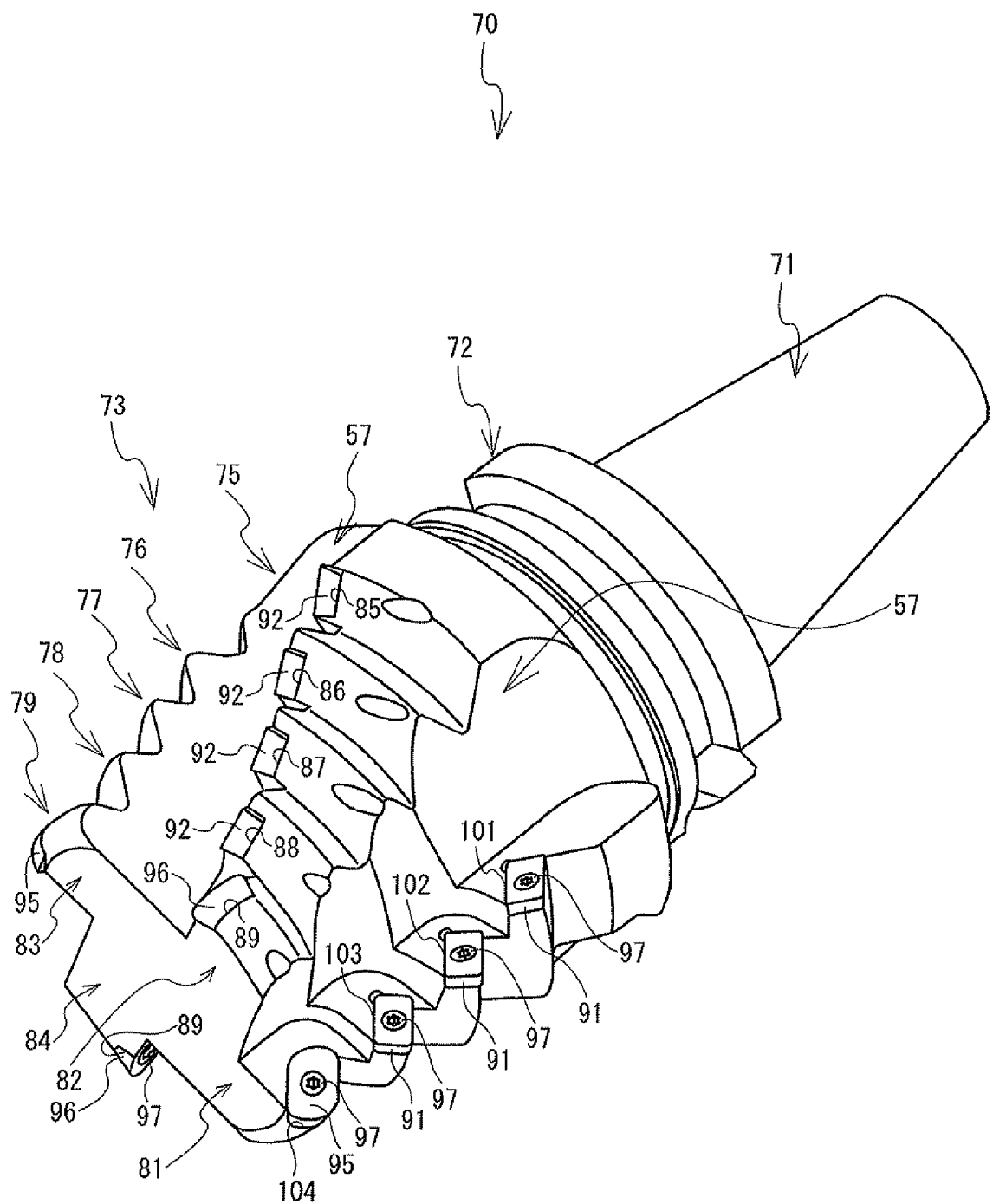
FIG. 12 is an oblique view of a semi-finishing cutter 70.

Hereinafter, a semi-finishing cutter 70 that is an embodiment of the present disclosure will be explained with reference to the drawings. A blade root 1 that is shown in FIG. 1 is a base portion for mounting a turbine blade (not shown in the drawings) into a slot that is formed in the outer circumference of a rotor (not shown in the drawings) that is used in a generator. The semi-finishing cutter 70 that is shown in FIG. 12 is a throwaway type of rotary cutting tool that is used in a semi-finishing process (refer to FIG. 2, S11) that is performed as the second of a series processes for cutting the blade root 1.

First, the shape of the blade root 1 will be explained. As shown in FIG. 1, the blade root 1 that is the base portion of the turbine blade is bilaterally symmetrical with respect to its own longitudinal direction, and is formed such that the blade root 1 gradually becomes narrower towards a tip end, in an upside-down Christmas tree shape in which the width of the root increases and decreases. On an outer side face of the blade root 1, a first wide portion 11, a second wide portion 12, a third wide portion 13, and a fourth wide portion 14 are formed with intervals between the wide portions such that the width of the root gradually increases from the tip end to a back end.

In addition, a first narrow portion 15 is formed between the first wide portion 11 and the second wide portion 12, a second narrow portion 16 is formed between the second wide portion 12 and the third wide portion 13, and a third narrow portion 17 is formed between the third wide portion 13 and the fourth wide portion 14. A fourth narrow portion 18 is formed after the fourth wide portion 14. The width of the root at the second narrow portion 16 is wider than the width of the root at the first narrow portion 15. The width of the root at the third narrow portion 17 is wider than the width of the root at the second narrow portion 16. The width of the root at the fourth narrow portion 18 is wider than the width of the root at the third narrow portion 17.

Figure 2:
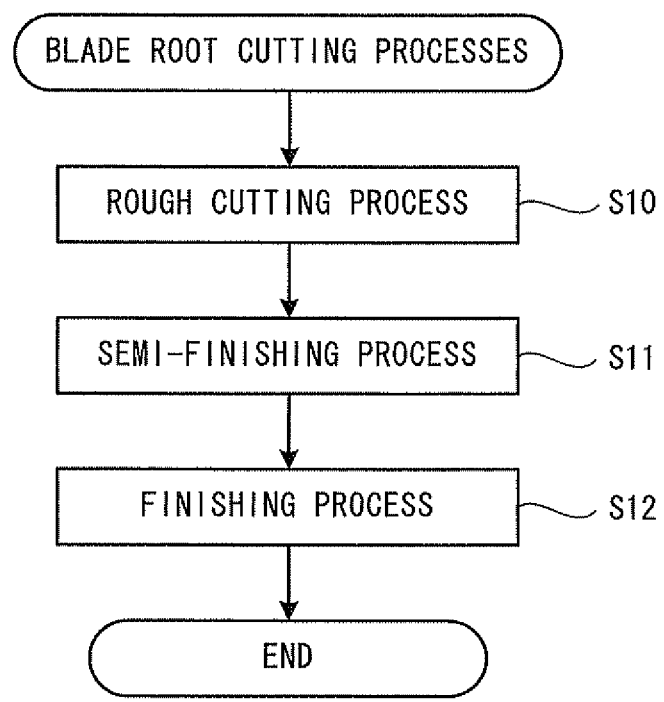
FIG. 2 is a flowchart of a blade root cutting process.

Next, the cutting processes for the blade root 1 will be explained. As shown in FIG. 2, the blade root cutting processes include the rough cutting process (S10), a semi-finishing process (S11), and a finishing process (S12). Hereinafter, the contents of these three processes will be explained sequentially in detail.

Figure 3:
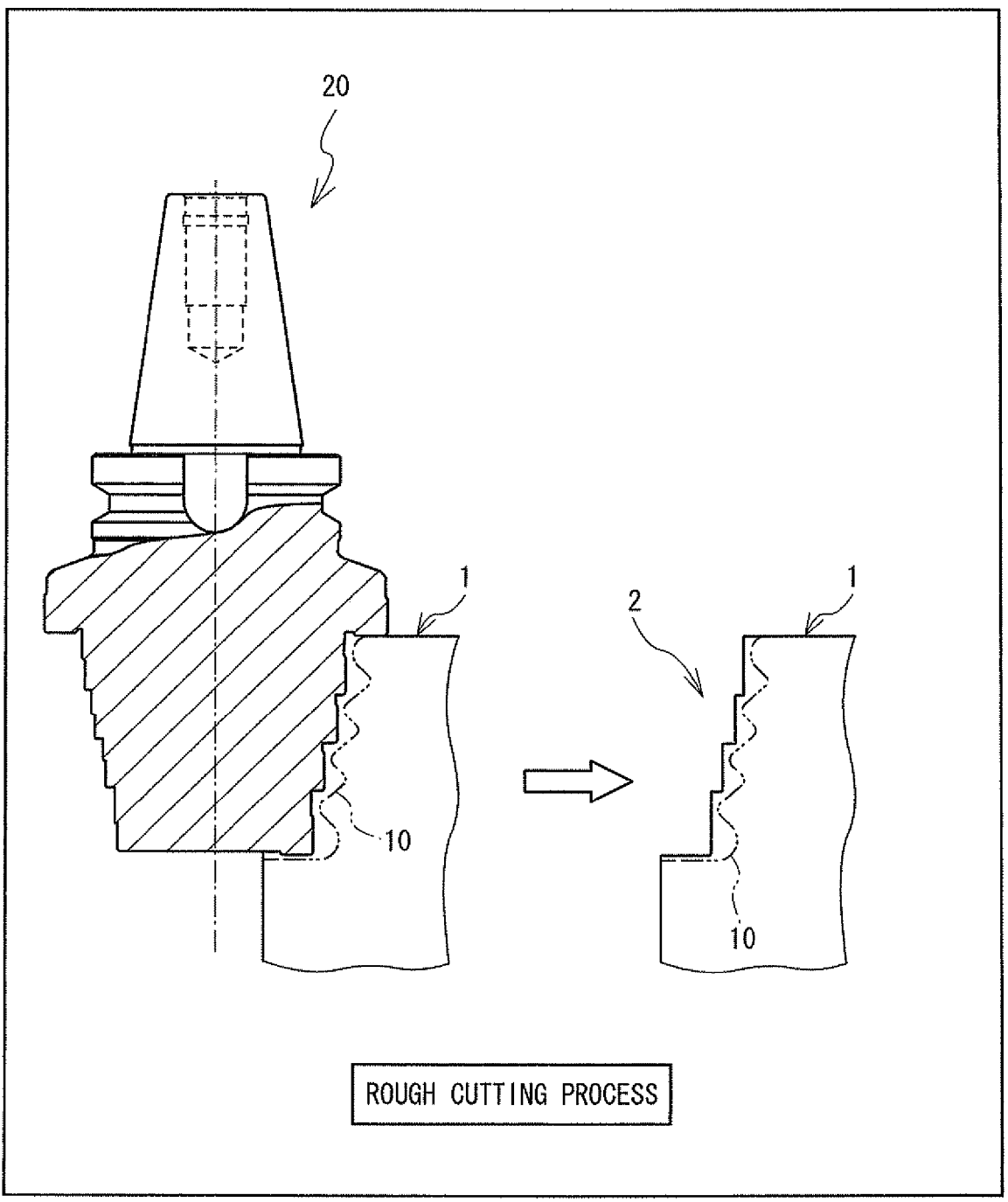
FIG. 3 is a figure that shows the content of a rough cutting process.
Figure 4:
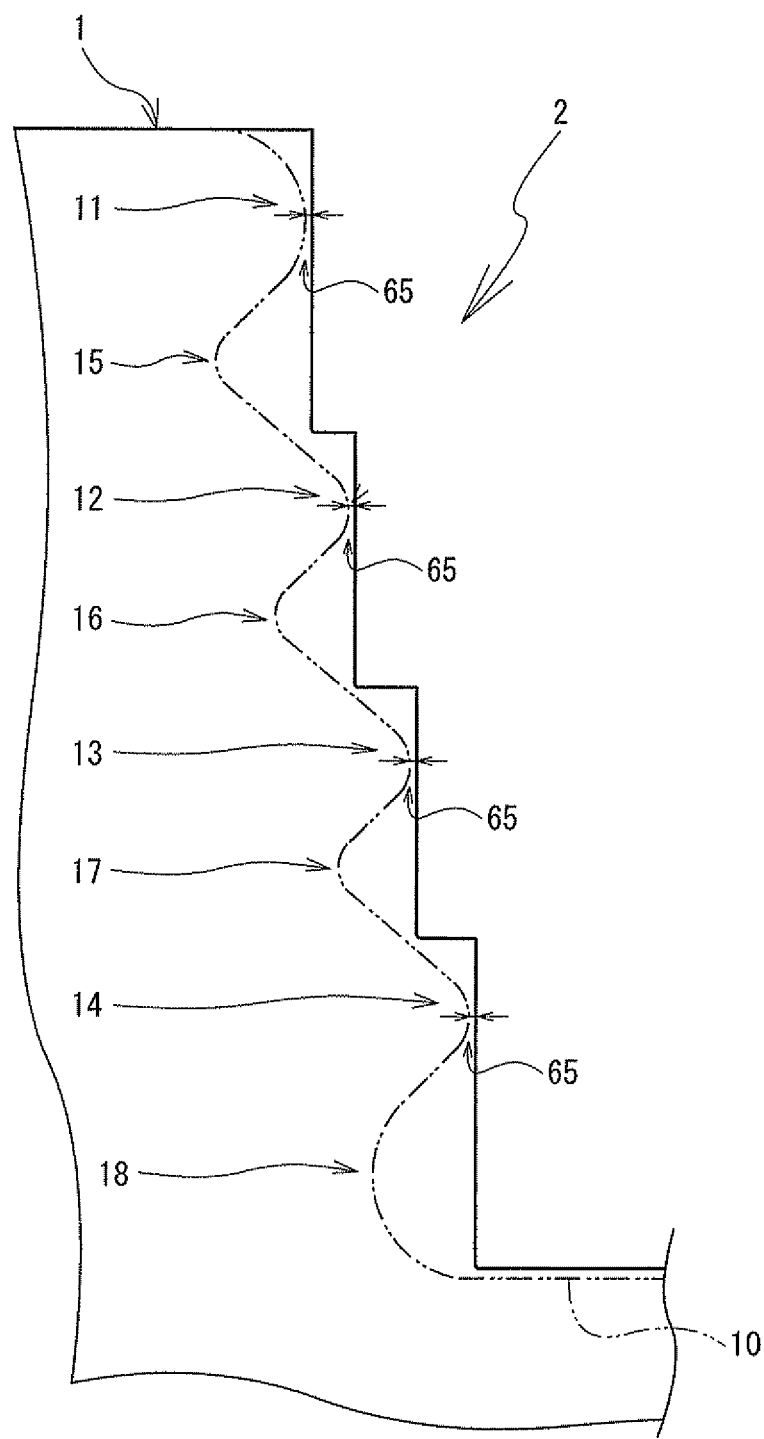
FIG. 4 is an enlarged partial view of the blade root 1 after the rough cutting process is completed.

First, the rough cutting process (S10) will be explained. As shown in FIG. 3, in a case where it is assumed that the blade root 1 will be formed in a planned blade root shape 10 (indicated by the dash-and-two-dot line) in the end, a rough cut shape 2 is first cut in the blade root 1 using the rough cutting cutter 20. The contour of the rough cut shape 2 is cut into a stepped shape such that the diameter becomes narrower with each successive step in the longitudinal direction of the planned blade root shape 10. The rough cutting of the rough cut shape 2 is such that specified cutting allowances 65 are left at the first wide portion 11, the second wide portion 12, the third wide portion 13, and the fourth wide portion 14 of the planned blade root shape 10, as shown in FIG. 4.

In other words, the first narrow portion 15, the second narrow portion 16, the third narrow portion 17, and the fourth narrow portion 18, where the width of the root is narrow, are cut in the semi-finishing process that follows, and the first wide portion 11, the second wide portion 12, the third wide portion 13, and the fourth wide portion 14, where the width of the root is wide, are cut first in the rough cutting process. Accordingly, the first wide portion 11, the second wide portion 12, the third wide portion 13, and the fourth wide portion 14 have already been cut when further cutting is performed by a semi-finishing cutter 70 that is described below. Therefore, the narrow portions of the semi-finishing cutter 70 (refer to FIG. 12) that correspond to the first wide portion 11, the second wide portion 12, the third wide portion 13, and the fourth wide portion 14 do not come into contact with the side face of the blade root 1. The strength of the narrow portions is less than that of other portions, but because the narrow portions do not come into contact with the blade root 1, the load that bears on the semi-finishing cutter 70 may be reduced.

Figure 5:
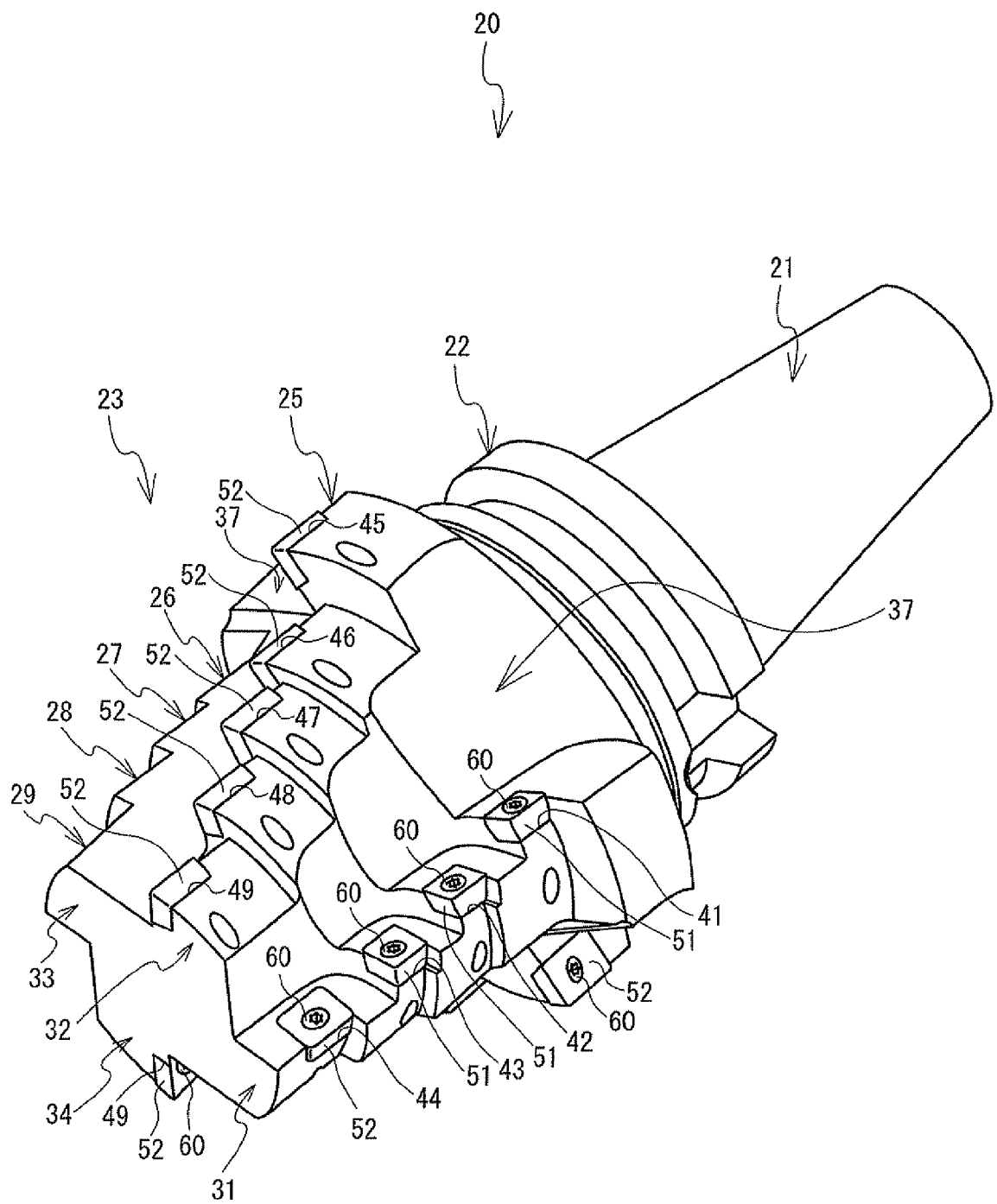
FIG. 5 is an oblique view of a rough cutting cutter 20.

Next, the structure of the rough cutting cutter 20 will be explained. As shown in FIG. 5, the rough cutting cutter 20 is a throwaway type of rotary cutting tool to which a removable tip that has a cutting edge may be fastened. The rough cutting cutter 20 is provided with a tool body 23 that becomes narrower in a stepped shape toward the tip end in the axial direction. A substantially cylindrical seat portion 22, which may come into contact with the end of a main shaft of a machine tool that is not shown in the drawings, is provided coaxially on a back end portion of the tool body 23 in the axial direction. A tapered portion 21, which may be mounted in a tool mounting hole (not shown in the drawings) that is provided on the main shaft, is provided coaxially on a back end portion of the seat portion 22 in the axial direction. The rough cutting cutter 20 is a rotary cutting tool with a right-hand cut and a left-hand helix.

Figure 6:
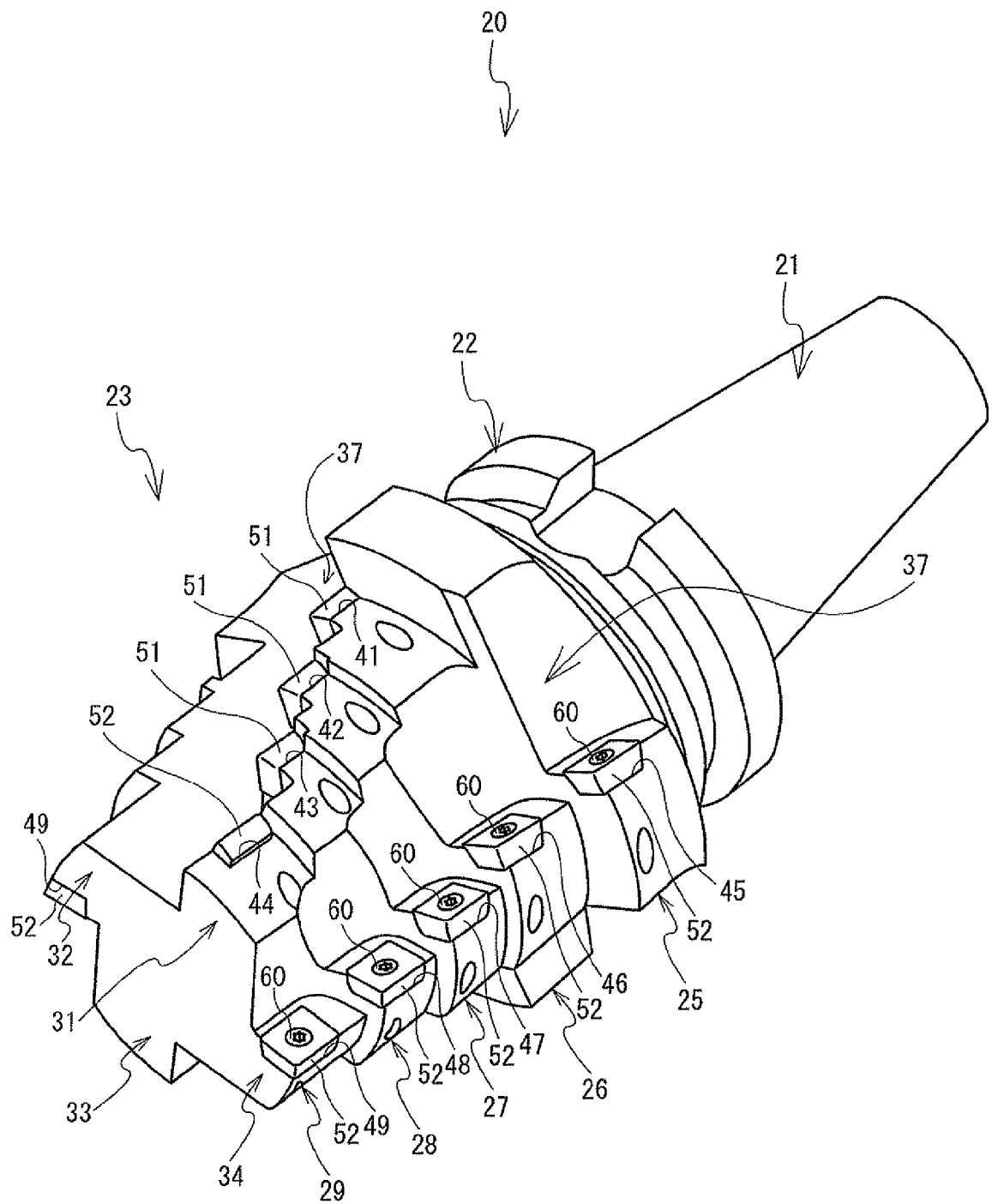
FIG. 6 is an oblique view of the rough cutting cutter 20.

Next, the shape of the tool body 23 will be explained. As shown in FIG. 5 and FIG. 6, the tool body 23 has a stepshaped contour that almost matches the rough cut shape 2 to be formed (refer to the right side of FIG. 3). In order from the seat portion 22 end to the tip end in the axial direction, the tool body 23 is configured from a first step portion 25 whose shape, as viewed from the tip end side in the axial direction, is roughly cross-shaped, a second step portion 26 that is provided coaxially on the tip end side of the first step portion 25 in the axial direction and that is formed in the same shape as, but smaller than, the first step portion 25, a third step portion 27 that is provided coaxially on the tip end side of the second step portion 26 in the axial direction and that is formed in the same shape as, but smaller than, the second step portion 26, a fourth step portion 28 that is provided coaxially on the tip end side of the third step portion 27 in the axial direction and that is formed in the same shape as, but smaller than, the third step portion 27, and a fifth step portion 29 that is provided coaxially on the tip end side of the fourth step portion 28 in the axial direction and that is formed in the same shape as, but smaller than, the fourth step portion 28.

Figure 7:
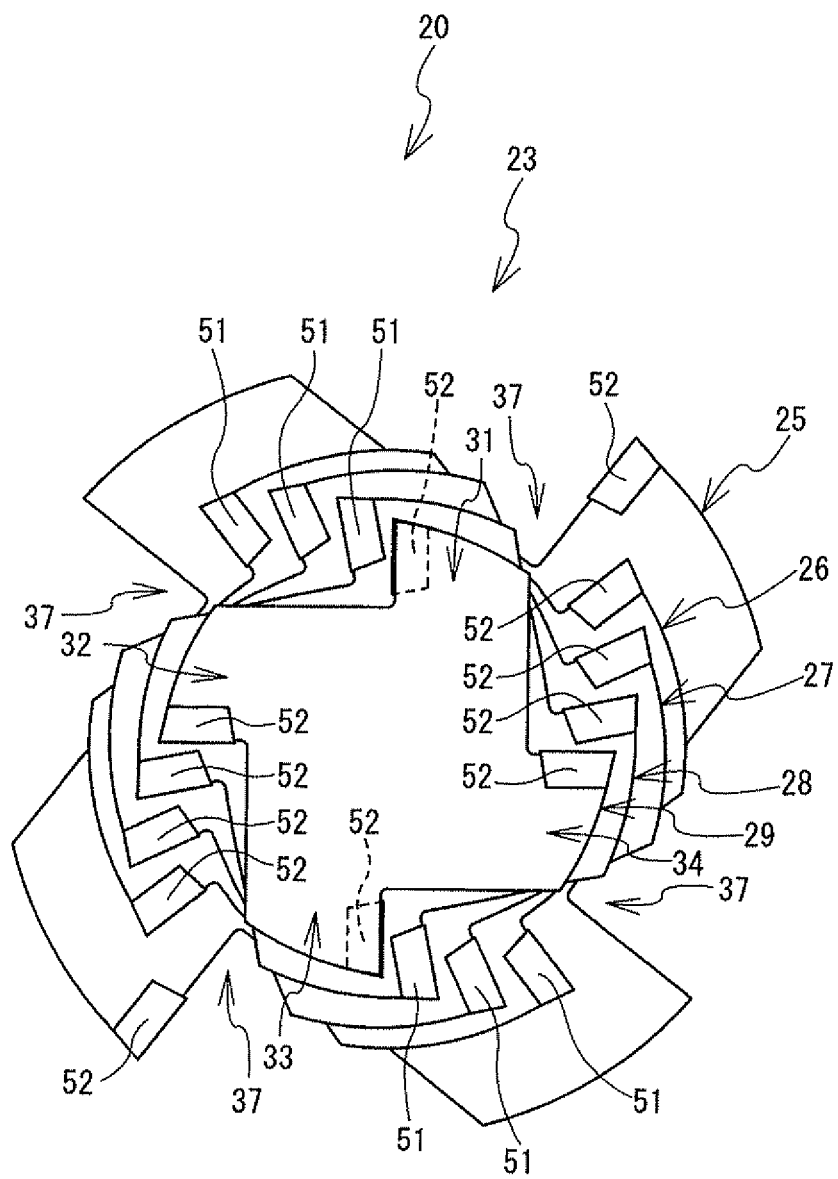
FIG. 7 is a view of the rough cutting cutter 20 seen from a tip side in the axial direction.

When the tool body 23 thus configured is viewed from the tip end side in the axial direction, the positions of the fifth step portion 29, the fourth step portion 28, the third step portion 27, the second step portion 26, and the first step portion 25 are twisted leftward (counterclockwise) from the tip end to the back end, as shown in FIG. 7. Four stepped grooves 37 are also formed in the axial direction of the tool body 23. When viewed from the tip end side in the axial direction, the stepped grooves 37 are twisted leftward (counterclockwise).

Next, the first to the fifth step portions 25 to 29, from which the tool body 23 is configured, will be explained in order with reference to FIG. 5 to FIG. 7. The fifth step portion 29 that is at the tip end of the tool body 23 in the axial direction will be explained first, after which the fourth step portion 28, the third step portion 27, the second step portion 26, and the first step portion 25 will be explained in that order.

First, the structure of the fifth step portion 29 will be explained. As shown in FIG. 5 to FIG. 7, the fifth step portion 29 is a rectangular column whose shape, as viewed from the tip end side in the axial direction, is roughly cross-shaped. A first projecting portion 31, a second projecting portion 32, a third projecting portion 33, and a fourth projecting portion 34 that project outward in the four directions of the rough cross shape are provided in the fifth step portion 29. Grooves that are L-shaped when viewed from the tip end side in the axial direction are formed between the first projecting portion 31 and the second projecting portion 32, between the second projecting portion 32 and the third projecting portion 33, between the third projecting portion 33 and the fourth projecting portion 34, and between the fourth projecting portion 34 and the first projecting portion 31, and each groove forms a portion of one of the stepped grooves 37.

Further, as shown in FIG. 5 and FIG. 6, a cutting tip seat 44, which is formed in a rectangular shape, is provided as a recessed area at a back end side of an inner face of the first projecting portion 31, facing one of the stepped grooves 37. A cutting tip seat 49, which is formed in a rectangular shape, is provided as a recessed area at a front end side of an inner face of the second projecting portion 32, facing one of the stepped grooves 37. Another cutting tip seat (not shown in the drawings), which is formed in a rectangular shape, is provided as a recessed area at a back end side of an inner face of the third projecting portion 33, facing one of the stepped grooves 37. Another cutting tip seat 49 (refer to FIG. 6), which is formed in a rectangular shape, is provided as a recessed area at a front end side of an inner face of the fourth projecting portion 34, facing one of the stepped grooves 37. In other words, the cutting tip seats 44 and 49 are arranged in a staggered pattern in relation to one another.

A rectangular tip 52 is fitted into the cutting tip seat 44 that is provided as the recessed area in the first projecting portion 31, and is secured by a bolt 60. Another rectangular tip 52 is fitted into the cutting tip seat 49 that is provided as the recessed area in the second projecting portion 32, and is secured by a bolt (not shown in the drawings). Another rectangular tip 52 (refer to FIG. 7) is fitted into the cutting tip seat (not shown in the drawings) that is provided as the recessed area in the third projecting portion 33, and is secured by a bolt (not shown in the drawings). Another rectangular tip 52 is fitted into the cutting tip seat 49 that is provided as the recessed area in the fourth projecting portion 34, and is secured by another bolt 60. Each of the rectangular tips 52 is disposed such that, of the two long sides that are parallel to the axial direction of the tool body 23, the outside side is parallel to the longitudinal direction of the planned blade root shape 10 (refer to FIG. 4).

Next, the structure of the fourth step portion 28 will be explained. As shown in FIG. 5 to FIG. 7, the fourth step portion 28, like the fifth step portion 29, is a rectangular column whose shape, as viewed from the tip end side in the axial direction, is roughly cross-shaped. The first projecting portion 31, the second projecting portion 32, the third projecting portion 33, and the fourth projecting portion 34 are provided in the fourth step portion 28. Grooves that are L-shaped when viewed from the tip end side in the axial direction are formed between the first projecting portion 31 and the second projecting portion 32, between the second projecting portion 32 and the third projecting portion 33, between the third projecting portion 33 and the fourth projecting portion 34, and between the fourth projecting portion 34 and the first projecting portion 31, and each groove forms a portion of one of the stepped grooves 37.

Further, as shown in FIG. 5 and FIG. 6, a cutting tip seat 43, which is formed in a rectangular shape, is provided as a recessed area at a back end side of an inner face of the first projecting portion 31, facing one of the stepped grooves 37. A cutting tip seat 48, which is formed in a rectangular shape, is provided as a recessed area at a front end side of an inner face of the second projecting portion 32, facing one of the stepped grooves 37. Another cutting tip seat (not shown in the drawings), which is formed in a rectangular shape, is provided as a recessed area at a back end side of an inner face of the third projecting portion 33, facing one of the stepped grooves 37. Another cutting tip seat 48 (refer to FIG. 6), which is formed in a rectangular shape, is provided as a recessed area at a front end side of an inner face of the fourth projecting portion 34, facing one of the stepped grooves 37. In other words, the cutting tip seats 43 and 48 are arranged in a staggered pattern in relation to one another.

A square tip 51 is fitted into the cutting tip seat 43 that is provided as the recessed area in the first projecting portion 31, and is secured by another bolt 60 (refer to FIG. 5). Another rectangular tip 52 is fitted into the cutting tip seat 48 that is provided as the recessed area in the second projecting portion 32, and is secured by a bolt (not shown in the drawings). Another square tip 51 (refer to FIG. 7) is fitted into the cutting tip seat (not shown in the drawings) that is provided as the recessed area in the third projecting portion 33, and is secured by a bolt (not shown in the drawings). Another rectangular tip 52 is fitted into the cutting tip seat 48 that is provided as the recessed area in the fourth projecting portion 34, and is secured by another bolt 60. Each of the square tips 51 is disposed such that, of the two sides that are parallel to the axial direction of the tool body 23, the outside side is parallel to the longitudinal direction of the planned blade root shape 10 (refer to FIG. 4), and each of the rectangular tips 52 is disposed such that, of the two long sides that are parallel to the axial direction of the tool body 23, the outside side is parallel to the longitudinal direction of the planned blade root shape 10.

Next, the structure of the third step portion 27 will be explained. As shown in FIG. 5 to FIG. 7, the third step portion 27, like the fifth step portion 29, is a rectangular column whose shape, as viewed from the tip end side in the axial direction, is roughly cross-shaped. The first projecting portion 31, the second projecting portion 32, the third projecting portion 33, and the fourth projecting portion 34 are provided in the third step portion 27. Grooves that are L-shaped when viewed from the tip end side in the axial direction are formed between the first projecting portion 31 and the second projecting portion 32, between the second projecting portion 32 and the third projecting portion 33, between the third projecting portion 33 and the fourth projecting portion 34, and between the fourth projecting portion 34 and the first projecting portion 31, and each groove forms a portion of one of the stepped grooves 37.

Further, as shown in FIG. 5 and FIG. 6, a cutting tip seat 42, which is formed in a rectangular shape, is provided as a recessed area at a back end side of an inner face of the first projecting portion 31, facing one of the stepped grooves 37. A cutting tip seat 47, which is formed in a rectangular shape, is provided as a recessed area at a front end side of an inner face of the second projecting portion 32, facing one of the stepped grooves 37. Another cutting tip seat (not shown in the drawings), which is formed in a rectangular shape, is provided as a recessed area at a back end side of an inner face of the third projecting portion 33, facing one of the stepped grooves 37. Another cutting tip seat 47 (refer to FIG. 6), which is formed in a rectangular shape, is provided as a recessed area at a front end side of an inner face of the fourth projecting portion 34, facing one of the stepped grooves 37. In other words, the cutting tip seats 42 and 47 are arranged in a staggered pattern in relation to one another.

Another square tip 51 is fitted into the cutting tip seat 42 that is provided as the recessed area in the first projecting portion 31, and is secured by another bolt 60 (refer to FIG. 5). Another rectangular tip 52 is fitted into the cutting tip seat 47 that is provided as the recessed area in the second projecting portion 32, and is secured by a bolt (not shown in the drawings). Another square tip 51 (refer to FIG. 7) is fitted into the cutting tip seat (not shown in the drawings) that is provided as the recessed area in the third projecting portion 33, and is secured by a bolt (not shown in the drawings). Another rectangular tip 52 is fitted into the cutting tip seat 47 that is provided as the recessed area in the fourth projecting portion 34, and is secured by another bolt 60. Each of the square tips 51 is disposed such that, of the two sides that are parallel to the axial direction of the tool body 23, the outside side is parallel to the longitudinal direction of the planned blade root shape 10 (refer to FIG. 4), and each of the rectangular tips 52 is disposed such that, of the two long sides that are parallel to the axial direction of the tool body 23, the outside side is parallel to the longitudinal direction of the planned blade root shape 10.

Next, the structure of the second step portion 26 will be explained. As shown in FIG. 5 to FIG. 7, the second step portion 26, like the fifth step portion 29, is a rectangular column whose shape, as viewed from the tip end side in the axial direction, is roughly cross-shaped. The first projecting portion 31, the second projecting portion 32, the third projecting portion 33, and the fourth projecting portion 34 are provided in the second step portion 26. Grooves that are L-shaped when viewed from the tip end side in the axial direction are formed between the first projecting portion 31 and the second projecting portion 32, between the second projecting portion 32 and the third projecting portion 33, between the third projecting portion 33 and the fourth projecting portion 34, and between the fourth projecting portion 34 and the first projecting portion 31, and each groove forms a portion of one of the stepped grooves 37.

Further, as shown in FIG. 5 and FIG. 6, a cutting tip seat 41, which is formed in a rectangular shape, is provided as a recessed area at a back end side of an inner face of the first projecting portion 31, facing one of the stepped grooves 37. A cutting tip seat 46, which is formed in a rectangular shape, is provided as a recessed area at a front end side of an inner face of the second projecting portion 32, facing one of the stepped grooves 37. Another cutting tip seat (not shown in the drawings), which is formed in a rectangular shape, is provided as a recessed area at a back end side of an inner face of the third projecting portion 33, facing one of the stepped grooves 37. Another cutting tip seat 46 (refer to FIG. 6), which is formed in a rectangular shape, is provided as a recessed area at a front end side of an inner face of the fourth projecting portion 34, facing one of the stepped grooves 37. In other words, the cutting tip seats 41 and 46 are arranged in a staggered pattern in relation to one another.

Another square tip 51 is fitted into the cutting tip seat 41 that is provided as the recessed area in the first projecting portion 31, and is secured by another bolt 60 (refer to FIG. 5). Another rectangular tip 52 is fitted into the cutting tip seat 46 that is provided as the recessed area in the second projecting portion 32, and is secured by a bolt (not shown in the drawings). Another square tip 51 (refer to FIG. 7) is fitted into the cutting tip seat (not shown in the drawings) that is provided as the recessed area in the third projecting portion 33, and is secured by a bolt (not shown in the drawings). Another rectangular tip 52 is fitted into the cutting tip seat 46 that is provided as the recessed area in the fourth projecting portion 34, and is secured by another bolt 60. Each of the square tips 51 is disposed such that, of the two sides that are parallel to the axial direction of the tool body 23, the outside side is parallel to the longitudinal direction of the planned blade root shape 10 (refer to FIG. 4), and each of the rectangular tips 52 is disposed such that, of the two long sides that are parallel to the axial direction of the tool body 23, the outside side is parallel to the longitudinal direction of the planned blade root shape 10.

Next, the structure of the first step portion 25 will be explained. As shown in FIG. 5 to FIG. 7, the first step portion 25, like the fifth step portion 29, is a rectangular column whose shape, as viewed from the tip end side in the axial direction, is roughly cross-shaped. The first projecting portion 31, the second projecting portion 32, the third projecting portion 33, and the fourth projecting portion 34 are provided in the first step portion 25. Grooves that are U-shaped when viewed from the tip end side in the axial direction are formed between the first projecting portion 31 and the second projecting portion 32, between the second projecting portion 32 and the third projecting portion 33, between the third projecting portion 33 and the fourth projecting portion 34, and between the fourth projecting portion 34 and the first projecting portion 31, and each of the grooves forms a portion of one of the stepped grooves 37.

Further, as shown in FIG. 5 and FIG. 6, a cutting tip seat 45, which is formed in a rectangular shape, is provided as a recessed area at a front end side of an inner face of the second projecting portion 32, facing one of the stepped grooves 37. Another cutting tip seat 45, which is formed in a rectangular shape, is provided as a recessed area at a front end side of an inner face of the fourth projecting portion 34, facing one of the stepped grooves 37. In other words, the cutting tip seats 45, 45 are arranged in identical positions in relation to one another.

Another rectangular tip 52 is fitted into the cutting tip seat 45 that is provided as the recessed area in the second projecting portion 32, and is secured by a bolt (not shown in the drawings). Another rectangular tip 52 is fitted into the cutting tip seat 45 that is provided as the recessed area in the fourth projecting portion 34, and is secured by another bolt 60 (refer to FIG. 6). Each of the rectangular tips 52 is disposed such that, of the two sides that are parallel to the axial direction of the tool body 23, the outside side is parallel to the longitudinal direction of the planned blade root shape 10 (refer to FIG. 4).

Figure 8:
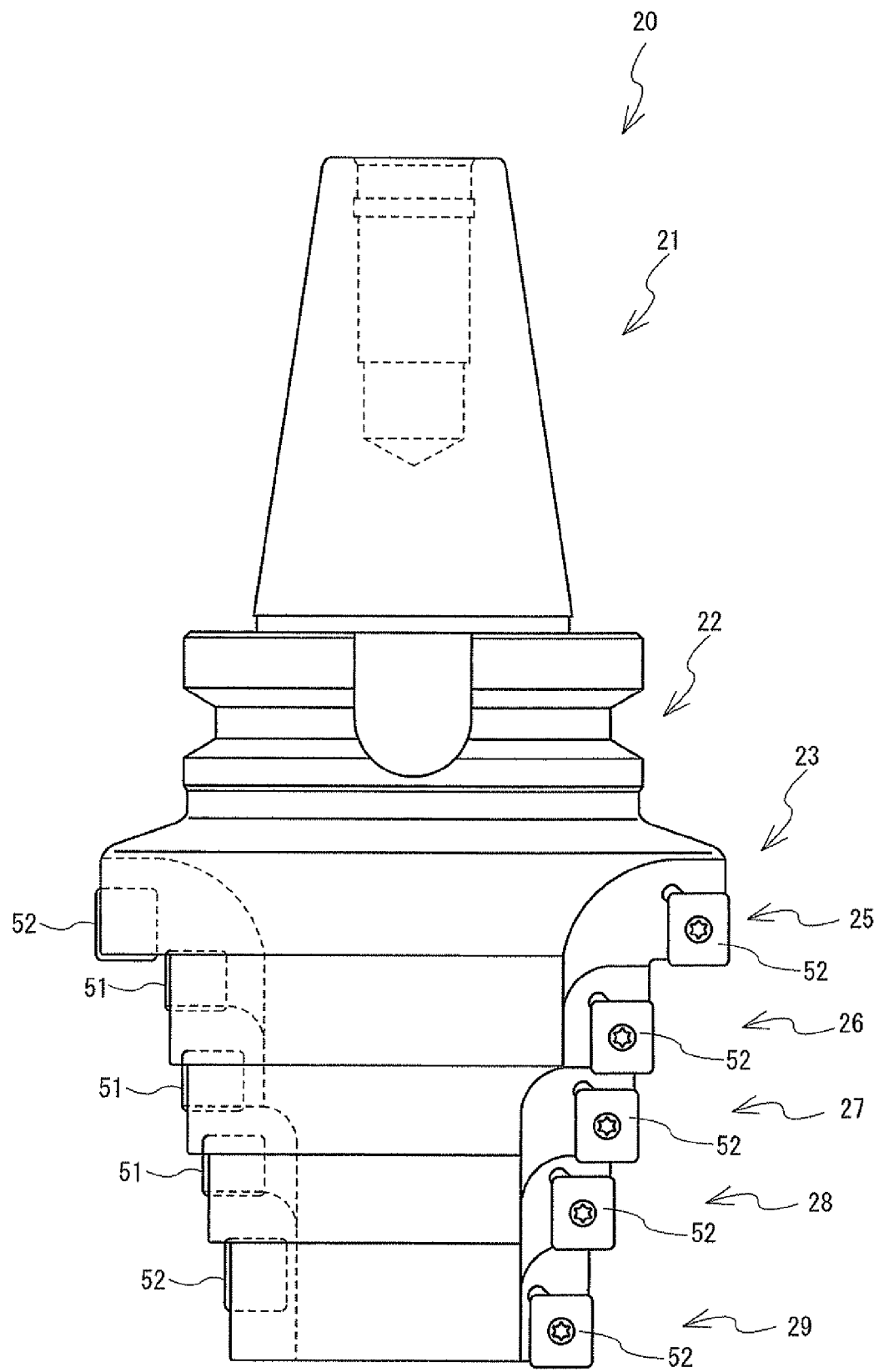
FIG. 8 is a figure that shows positional relationships among square tips 51 and rectangular tips 52 in the axial direction of the rough cutting cutter 20.

Next, the positional relationships among the square tips 51 and the rectangular tips 52 in the axial direction of the rough cutting cutter 20 will be explained. First, as shown in FIG. 8, in the first step portion 25, the rectangular tip 52 that is fastened in the second projecting portion 32 and the rectangular tip 52 that is fastened in the fourth projecting portion 34 are disposed on the same level in the axial direction.

Further, in each of the second step portion 26 to the fourth step portion 28, the square tips 51 that are fastened in the first projecting portions 31 and the third projecting portions 33 are arranged in a staggered pattern in the axial direction in relation to the rectangular tips 52 that are fastened in the second projecting portions 32 and the fourth projecting portions 34. In the fifth step portion 29 as well, the rectangular tips 52 that are fastened in the first projecting portion 31 and the third projecting portion 33 are arranged in a staggered pattern in the axial direction in relation to the rectangular tips 52 that are fastened in the second projecting portion 32 and the fourth projecting portion 34.

Figure 9:
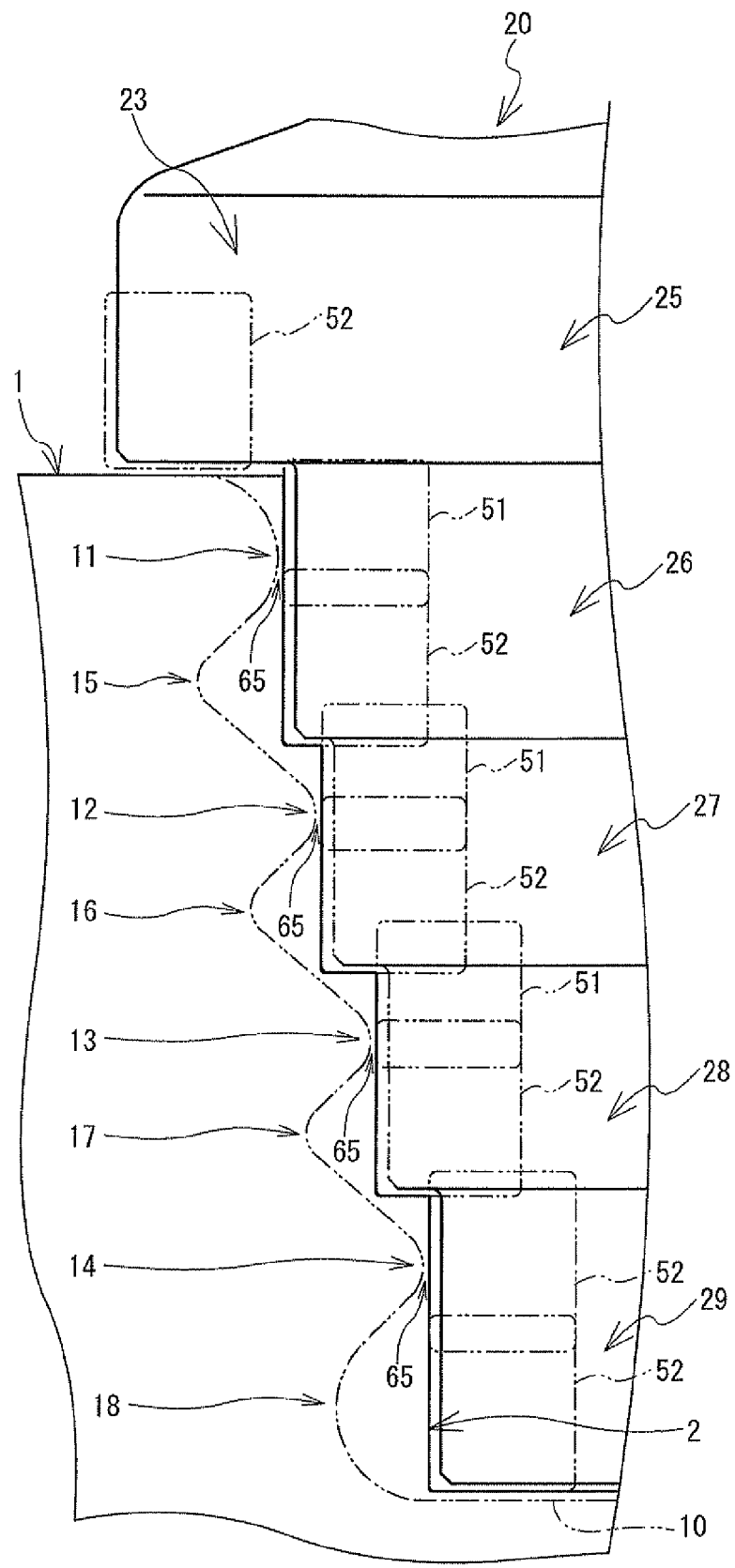
FIG. 9 is a figure that shows a relationship between a rough cut shape 2 that is formed in the blade root 1 and movement paths of the square tips 51 and the rectangular tips 52 in step portions 25 to 29.

Next, the method by which the rough cut shape 2 is cut in accordance with the paths in which the square tips 51 travel and the paths in which the rectangular tips 52 travel will be explained with reference to FIG. 9. FIG. 9 shows the paths in which each of the tips 51 and 52 travels as viewed in an axial direction cross section of the tool body 23. Here, explanation will be given assuming that the back end side of the tool body 23 in the axial direction is the upper side, and the tip end side in the axial direction is the lower side. As shown in FIG. 9, first, in the first step portion 25, the horizontal sides of the rectangular tips 52 at the lower side of the rotation path cut the top end of the planned blade root shape 10 into a planar shape.

Further, in the second step portion 26, the vertical sides of the square tips 51 at the top of the outer side of the rotation path and the vertical sides of the rectangular tips 52 at the bottom of the outer side of the rotation path are disposed along the same line, forming a cutting path that is a straight line that is parallel to the axial direction. A portion that corresponds to the first wide portion 11 of the planned blade root shape 10 is cut along the cutting path. At this time, the cutting is done parallel to the axial direction such that the specified cutting allowance 65 is left in relation to the first wide portion 11.

In the third step portion 27 as well, the vertical sides of the square tips 51 at the top of the outer side of the rotation path and the vertical sides of the rectangular tips 52 at the bottom of the outer side of the rotation path are disposed along the same line, forming a cutting path that is a straight line that is parallel to the axial direction. A portion that corresponds to the second wide portion 12 of the planned blade root shape 10 is cut along the cutting path. At this time, the cutting is done parallel to the axial direction such that the specified cutting allowance 65 is left in relation to the second wide portion 12.

In the fourth step portion 28 as well, the vertical sides of the square tips 51 at the top of the outer side of the rotation path and the vertical sides of the rectangular tips 52 at the bottom of the outer side of the rotation path are disposed along the same line, forming a cutting path that is a straight line that is parallel to the axial direction. A portion that corresponds to the third wide portion 13 of the planned blade root shape 10 is cut along the cutting path. At this time, the cutting is done parallel to the axial direction such that the specified cutting allowance 65 is left in relation to the third wide portion 13.

Further, in the fifth step portion 29, the vertical sides of the rectangular tips 52 at the top of the outer side of the rotation path and the vertical sides of the rectangular tips 52 at the bottom of the outer side of the rotation path are disposed along the same line, forming a cutting path that is a straight line that is parallel to the axial direction. A portion that corresponds to the fourth wide portion 14 and a portion that corresponds to the fourth narrow portion 18 of the planned blade root shape 10 are cut along the cutting path. At this time, the cutting is done parallel to the axial direction such that the specified cutting allowance 65 is left in relation to the fourth wide portion 14.

Between the bottom end portion of the vertical cutting path that is formed by the tips 51 and 52 in the second step portion 26 and the top end portion of the vertical cutting path that is formed by the tips 51 and 52 in the third step portion 27, cutting is done along the bottom side of the rotation path of the rectangular tips 52 that are fastened in the second step portion 26. Between the bottom end portion of the vertical cutting path that is formed by the tips 51 and 52 in the third step portion 27 and the top end portion of the vertical cutting path that is formed by the tips 51 and 52 in the fourth step portion 28, cutting is done along the bottom side of the rotation path of the rectangular tips 52 that are fastened in the third step portion 27. Between the bottom end portion of the vertical cutting path that is formed by the tips 51 and 52 in the fourth step portion 28 and the top end portion of the vertical cutting path that is formed by the tips 52 in the fifth step portion 29, cutting is done along the bottom side of the rotation path of the rectangular tips 52 that are fastened in the fourth step portion 28.

Thus, in the rough cutting process (S10), as shown in FIG. 4, the rough cut shape 2 that is cut in a stepped shape is formed such that the cutting allowances 65 are left in the first to the fourth wide portions 11 to 14 of the planned blade root shape 10.

Thus, in the rough cutting cutter 20, the square tips 51 and the rectangular tips 52 are disposed in a staggered pattern in the axial direction in the second to the fourth step portions 26 to 28. In contrast to a single cutting edge that is formed in each step portion of a known high-speed type rough cutting cutter, in the rough cutting cutter 20, a single cutting edge is formed by each pair of one of the square tips 51 and one of the rectangular tips 52. In other words, in each of the second to the fourth step portions 26 to 28, the four tips are disposed in a staggered pattern, so that two cutting edges are formed. In the known high-speed type rough cutting cutter, a large number of cutting edges (for example, six cutting edges) must be provided in order to cut the rough cut shape 2, which has a complex shape.

Accordingly, disposing each pair of one of the square tips 51 and one of the rectangular tips 52 in a staggered pattern, as in the rough cutting cutter 20, makes it possible to effectively reduce the frequency of contact with the outer side face of the blade root 1. Because this makes it possible to reduce the load that is borne by the blade root 1, the speed of the cutting by the rough cutting cutter 20 may be increased, so the cutting feed may be made faster. Therefore, the work of the rough cutting process may be performed efficiently. Furthermore, the square tips 51 and the rectangular tips 52 that are used in the rough cutting cutter 20 have simple shapes, so known commercially available throwaway tips may be used. In other words, it is not necessary to manufacture a tip with a new shape in order to use the rough cutting cutter 20, so it is possible to provide the rough cutting cutter 20 in an easy-to-use form without increasing the cost.

Figure 10:
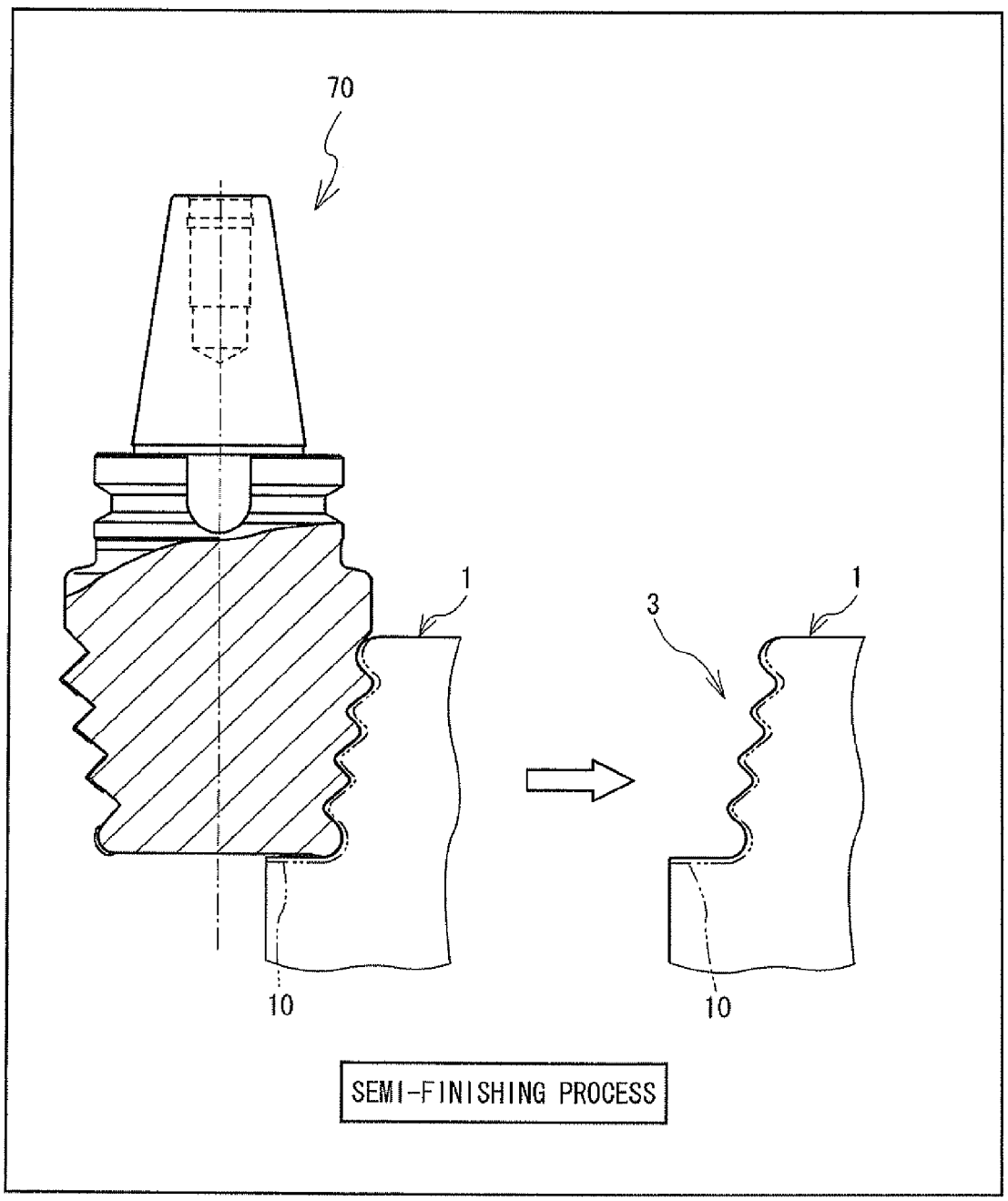
FIG. 10 is a figure that shows the content of a semi-finishing process.
Figure 11:
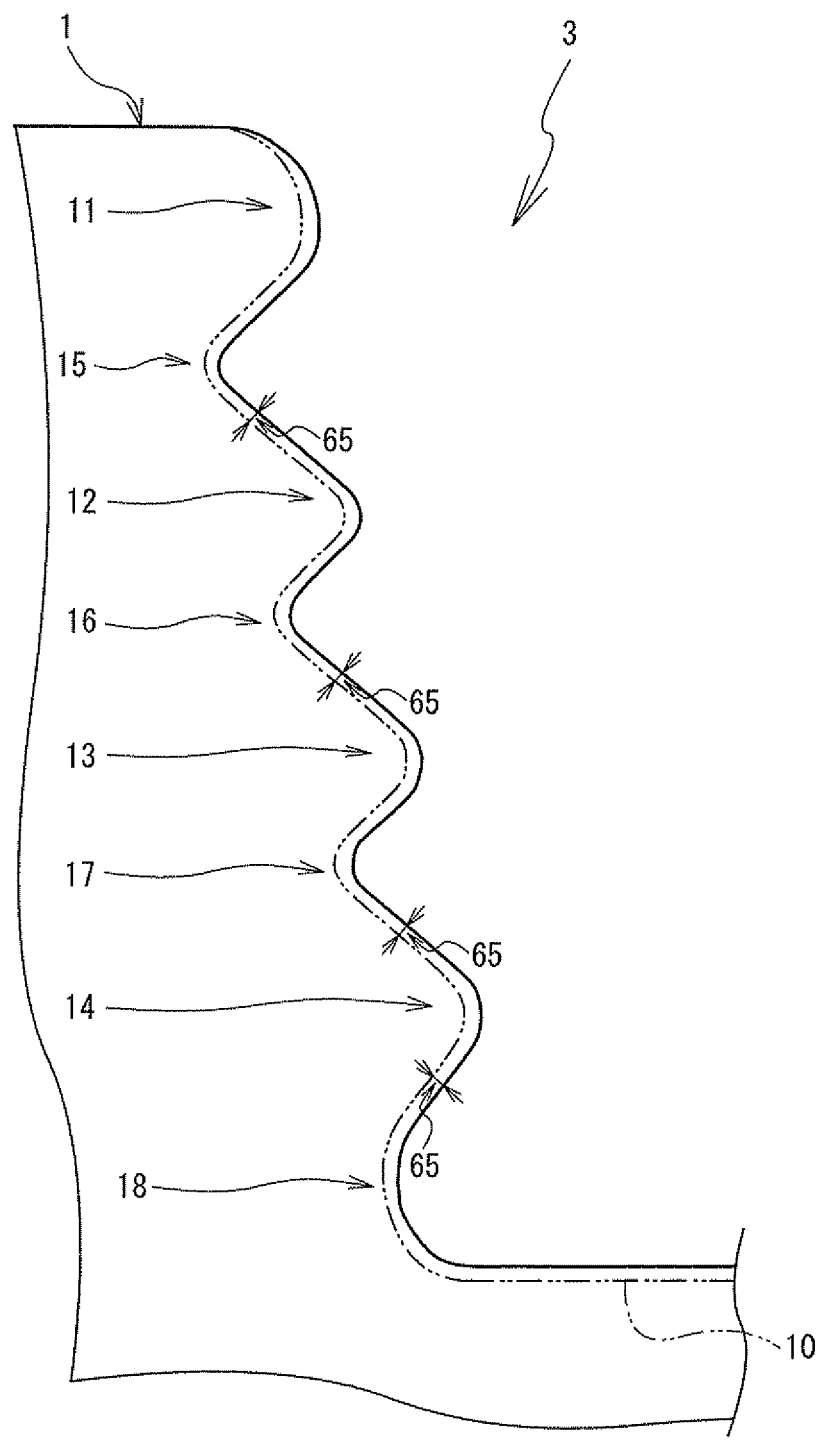
FIG. 11 is an enlarged partial view of the blade root 1 after the semi-finishing process is completed.

Next, the semi-finishing process (S11) will be explained. As shown in FIG. 10, the semi-finishing cutter 70 is used to cut a semi-finished shape 3 in the blade root 1 from the rough cut shape 2 that was cut in the blade root 1 in the rough cutting process shown in FIG. 3. The contour of the semi-finished shape 3 is cut into a state in which the specified cutting allowances 65 (refer to FIG. 11) are left in relation to the planned blade root shape 10. In other words, the cutting of the semi-finished shape 3, as shown in FIG. 11, is done such that, in addition to the cutting allowances 65 that were previously left in the first wide portion 11, the second wide portion 12, the third wide portion 13, and the fourth wide portion 14 of the planned blade root shape 10, the cutting allowances 65 are also left in the areas that will become the first narrow portion 15, the second narrow portion 16, the third narrow portion 17, and the fourth narrow portion 18.

Next, the structure of the semi-finishing cutter 70 will be explained. As shown in FIG. 12, the semi-finishing cutter 70 is a throwaway type of rotary cutting tool to which a removable tip that has a cutting edge may be fastened. The semi-finishing cutter 70 is provided with a tool body 73 that becomes narrower in a stepped shape toward the tip in the axial direction. A substantially cylindrical seat portion 72, which may come into contact with the end of a main shaft of a machine tool that is not shown in the drawings, is provided coaxially on a back end portion of the tool body 73 in the axial direction. A tapered portion 71, which may be mounted in a tool mounting hole (not shown in the drawings) that is provided on the main shaft, is provided coaxially on a back end portion of the seat portion 72 in the axial direction.

Figure 13:
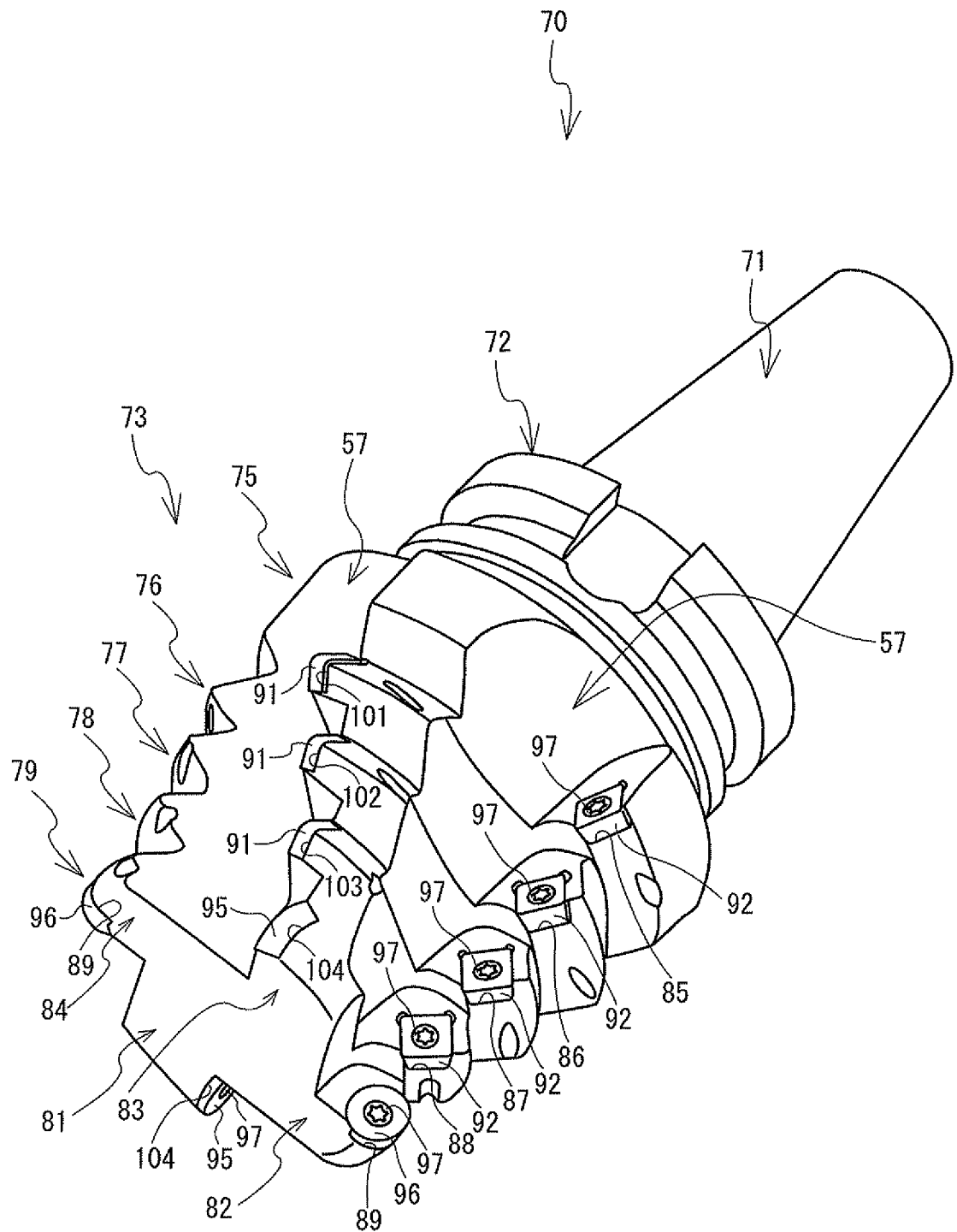
FIG. 13 is an oblique view of the semi-finishing cutter 70.

Next, the shape of the tool body 73 will be explained. As shown in FIG. 12 and FIG. 13, the tool body 73 has a contour that almost matches the semi-finished shape 3 that will be formed (refer to FIG. 10). The tool body 73 is configured from a first step portion 75 that is provided on the seat portion 72 side and whose shape, as viewed from the tip end side in the axial direction, is roughly cross-shaped, a second step portion 76 that is provided coaxially on the tip end side of the first step portion 75 in the axial direction and that is formed in the same shape as the first step portion 75, a third step portion 77 that is provided coaxially on the tip end side of the second step portion 76 in the axial direction and that is formed in the same shape as, but smaller than, the second step portion 76, a fourth step portion 78 that is provided coaxially on the tip end side of the third step portion 77 in the axial direction and that is formed in the same shape as, but smaller than, the third step portion 77, and a fifth step portion 79 that is provided coaxially on the tip end side of the fourth step portion 78 in the axial direction and that is formed in the same shape as, but smaller than, the fourth step portion 78.

Figure 14:
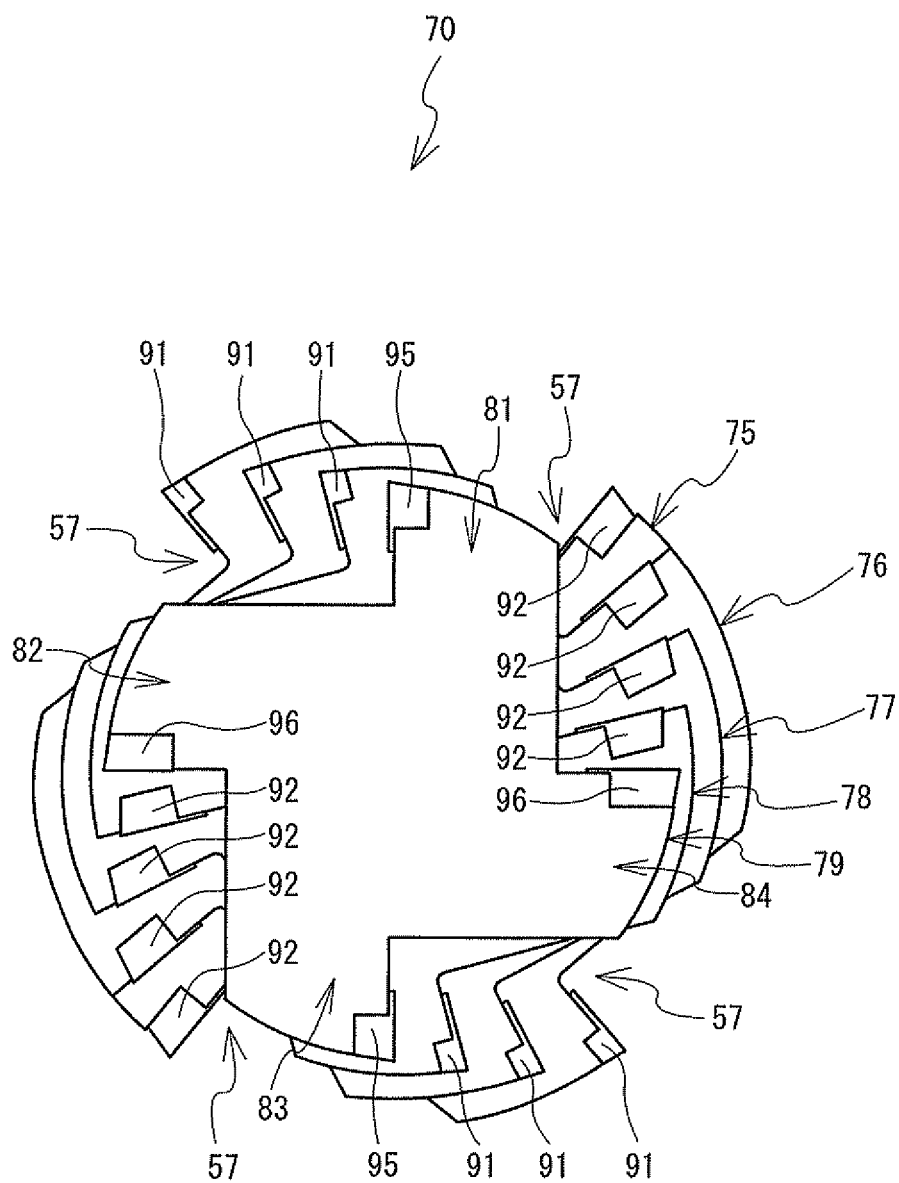
FIG. 14 is a view of the semi-finishing cutter 70 seen from a tip side in the axial direction.

When the tool body 73 thus configured is viewed from the tip end side in the axial direction, the positions of the fifth step portion 79, the fourth step portion 78, the third step portion 77, the second step portion 76, and the first step portion 75 are twisted leftward (counterclockwise) from the tip end to the back end, as shown in FIG. 14. Four stepped grooves 57 are also formed in the axial direction of the tool body 73. When viewed from the tip end side in the axial direction, the stepped grooves 57 are twisted leftward (counterclockwise).

Next, the first to the fifth step portions 75 to 79, from which the tool body 73 is configured, will be explained in order with reference to FIGS. 12 to 14. The fifth step portion 79 that is at the tip end of the tool body 73 in the axial direction will be explained first, after which the fourth step portion 78, the third step portion 77, the second step portion 76, and the first step portion 75 will be explained in that order.

First, the structure of the fifth step portion 79 will be explained. As shown in FIG. 12 to FIG. 14, the fifth step portion 79 is a rectangular column whose shape, as viewed from the tip end side in the axial direction, is roughly cross-shaped. A first projecting portion 81, a second projecting portion 82, a third projecting portion 83, and a fourth projecting portion 84 that project outward in the four directions of the rough cross shape are provided in the fifth step portion 79. Grooves that are L-shaped when viewed from the tip end side in the axial direction are formed between the first projecting portion 81 and the second projecting portion 82, between the second projecting portion 82 and the third projecting portion 83, between the third projecting portion 83 and the fourth projecting portion 84, and between the fourth projecting portion 84 and the first projecting portion 81, and each groove forms a portion of one of the stepped grooves 57.

Further, as shown in FIG. 12, a cutting tip seat 104, which is formed in a substantially elliptical shape, is provided as a recessed area in an inner face of the first projecting portion 81, facing one of the stepped grooves 57. A cutting tip seat 89, which is formed in a circular shape, is provided as a recessed area in an inner face of the second projecting portion 82, facing one of the stepped grooves 57. A cutting tip seat (not shown in the drawings), which is formed in a substantially elliptical shape, is provided as a recessed area in an inner face of the third projecting portion 83, facing one of the stepped grooves 57. Another cutting tip seat 89 (refer to FIG. 13), which is formed in a circular shape, is provided as a recessed area in an inner face of the fourth projecting portion 84, facing one of the stepped grooves 57.

A seed-shaped tip 95 that has a shape in which a pair of parallel straight sides are joined to one another at both ends by circular arcs is fitted into the cutting tip seat 104 that is provided as the recessed area in the first projecting portion 81, and is secured by a bolt 97. A disk-shaped circular tip 96 is fitted into the cutting tip seat 89 that is provided as the recessed area in the second projecting portion 82, and is secured by another bolt 97 (refer to FIG. 13). Another seed-shaped tip 95 is fitted into the cutting tip seat 104 that is provided as the recessed area in the third projecting portion 83, and is secured by a bolt (not shown in the drawings). Another circular tip 96 is fitted into the cutting tip seat 89 that is provided as the recessed area in the fourth projecting portion 84, and is secured by a bolt (not shown in the drawings). At this time, each of the seed-shaped tips 95 is disposed such that one of the two circular arc portions is positioned toward the outer side of the tool body 73 in the radial direction and the long sides are oriented obliquely in relation to the axial direction of the tool body 73 in an intersecting manner. In addition, each of the circular tips 96 is disposed such that a portion of its outer edge is positioned toward the outer side of the tool body 73 in the radial direction.

Next, the structure of the fourth step portion 78 will be explained. As shown in FIG. 12 to FIG. 14, the fourth step portion 78, like the fifth step portion 79, is a rectangular column whose shape, as viewed from the tip end side in the axial direction, is roughly cross-shaped. The first projecting portion 81, the second projecting portion 82, the third projecting portion 83, and the fourth projecting portion 84 are also provided in the fourth step portion 78. Grooves that are L-shaped when viewed from the tip end side in the axial direction are formed between the first projecting portion 81 and the second projecting portion 82, between the second projecting portion 82 and the third projecting portion 83, between the third projecting portion 83 and the fourth projecting portion 84, and between the fourth projecting portion 84 and the first projecting portion 81, and each groove forms a portion of one of the stepped grooves 57.

Further, as shown in FIG. 12, a cutting tip seat 103, which is formed in a rectangular shape, is provided as a recessed area in an inner face of the first projecting portion 81, facing one of the stepped grooves 57. A cutting tip seat 88, which is formed in a rectangular shape, is provided as a recessed area in an inner face of the second projecting portion 82, facing one of the stepped grooves 57. Another cutting tip seat 103 (refer to FIG. 13), which is formed in a rectangular shape, is provided as a recessed area in an inner face of the third projecting portion 83, facing one of the stepped grooves 57. A cutting tip seat (not shown in the drawings), which is formed in a rectangular shape, is provided as a recessed area in an inner face of the fourth projecting portion 84, facing one of the stepped grooves 57.

A rectangular tip 91 that has a slender rectangular shape is fitted into the cutting tip seat 103 that is provided as the recessed area in the first projecting portion 81, and is secured by another bolt 97. A square tip 92, which is formed in a square shape, is fitted into the cutting tip seat 88 that is provided as the recessed area in the second projecting portion 82, and is secured by another bolt 97 (refer to FIG. 13). Another rectangular tip 91 is fitted into the cutting tip seat 103 that is provided as the recessed area in the third projecting portion 83, and is secured by a bolt (not shown in the drawings). Another square tip 92 (refer to FIG. 14) is fitted into the cutting tip seat (not shown in the drawings) that is provided as the recessed area in the fourth projecting portion 84, and is secured by a bolt (not shown in the drawings). At this time, each of the rectangular tips 91 is disposed such that one of its four corner portions is positioned toward the outer side of the tool body 73 in the radial direction. In addition, each of the square tips 92 is disposed such that one of its four corner portions is positioned toward the outer side of the tool body 73 in the radial direction.

Next, the structure of the third step portion 77 will be explained. As shown in FIG. 12 to FIG. 14, the third step portion 77, like the fifth step portion 79, is a rectangular column whose shape, as viewed from the tip end side in the axial direction, is roughly cross-shaped. The first projecting portion 81, the second projecting portion 82, the third projecting portion 83, and the fourth projecting portion 84 are also provided in the third step portion 77. Grooves that are L-shaped when viewed from the tip end side in the axial direction are formed between the first projecting portion 81 and the second projecting portion 82, between the second projecting portion 82 and the third projecting portion 83, between the third projecting portion 83 and the fourth projecting portion 84, and between the fourth projecting portion 84 and the first projecting portion 81, and each groove forms a portion of one of the stepped grooves 57.

Further, as shown in FIG. 12, a cutting tip seat 102, which is formed in a rectangular shape, is provided as a recessed area in an inner face of the first projecting portion 81, facing one of the stepped grooves 57. A cutting tip seat 87, which is formed in a rectangular shape, is provided as a recessed area in an inner face of the second projecting portion 82, facing one of the stepped grooves 57. Another cutting tip seat 102, which is formed in a rectangular shape, is provided as a recessed area in an inner face of the third projecting portion 83, facing one of the stepped grooves 57. A cutting tip seat (not shown in the drawings), which is formed in a rectangular shape, is provided as a recessed area in an inner face of the fourth projecting portion 84, facing one of the stepped grooves 57.

Another rectangular tip 91 that has a slender rectangular shape is fitted into the cutting tip seat 102 that is provided as the recessed area in the first projecting portion 81, and is secured by another bolt 97. Another square tip 92, which is fanned in a square shape, is fitted into the cutting tip seat 87 that is provided as the recessed area in the second projecting portion 82, and is secured by another bolt 97 (refer to FIG. 13). Another rectangular tip 91 is fitted into the cutting tip seat 102 that is provided as the recessed area in the third projecting portion 83, and is secured by a bolt (not shown in the drawings). Another square tip 92 (refer to FIG. 14) is fitted into the cutting tip seat (not shown in the drawings) that is provided as the recessed area in the fourth projecting portion 84, and is secured by a bolt (not shown in the drawings). At this time, each of the rectangular tips 91 is disposed such that one of its four corner portions is positioned toward the outer side of the tool body 73 in the radial direction. In addition, each of the square tips 92 is disposed such that one of its four corner portions is positioned toward the outer side of the tool body 73 in the radial direction.

Next, the structure of the second step portion 76 will be explained. As shown in FIG. 12 to FIG. 14, the second step portion 76, like the fifth step portion 79, is a rectangular column whose shape, as viewed from the tip end side in the axial direction, is roughly cross-shaped. The first projecting portion 81, the second projecting portion 82, the third projecting portion 83, and the fourth projecting portion 84 are provided in the second step portion 76. Grooves that are L-shaped when viewed from the tip end side in the axial direction are formed between the first projecting portion 81 and the second projecting portion 82, between the second projecting portion 82 and the third projecting portion 83, between the third projecting portion 83 and the fourth projecting portion 84, and between the fourth projecting portion 84 and the first projecting portion 81, and each groove forms a step portion of one of the stepped grooves 57.

Further, as shown in FIG. 12, a cutting tip seat 101, which is formed in a rectangular shape, is provided as a recessed area in an inner face of the first projecting portion 81, facing one of the stepped grooves 57. A cutting tip seat 86, which is formed in a rectangular shape, is provided as a recessed area in an inner face of the second projecting portion 82, facing one of the stepped grooves 57. Another cutting tip seat 101, which is formed in a rectangular shape, is provided as a recessed area in an inner face of the third projecting portion 83, facing one of the stepped grooves 57. A cutting tip seat (not shown in the drawings), which is formed in a rectangular shape, is provided as a recessed area in an inner face of the fourth projecting portion 84, facing one of the stepped grooves 57.

Another rectangular tip 91 that has a slender rectangular shape is fitted into the cutting tip seat 101 that is provided as the recessed area in the first projecting portion 81, and is secured by another bolt 97. Another square tip 92, which is formed in a square shape, is fitted into the cutting tip seat 86 that is provided as the recessed area in the second projecting portion 82, and is secured by another bolt 97 (refer to FIG. 13). Another rectangular tip 91 is fitted into the cutting tip seat 101 that is provided as the recessed area in the third projecting portion 83, and is secured by a bolt (not shown in the drawings). Another square tip 92 (refer to FIG. 14) is fitted into the cutting tip seat (not shown in the drawings) that is provided as the recessed area in the fourth projecting portion 84, and is secured by a bolt (not shown in the drawings). At this time, each of the rectangular tips 91 is disposed such that one of its four corner portions is positioned toward the outer side of the tool body 73 in the radial direction. In addition, each of the square tips 92 is disposed such that one of its four corner portions is positioned toward the outer side of the tool body 73 in the radial direction.

Next, the structure of the first step portion 75 will be explained. As shown in FIG. 12 to FIG. 14, the first step portion 75, like the fifth step portion 79, is a rectangular column whose shape, as viewed from the tip end side in the axial direction, is roughly cross-shaped. The first projecting portion 81, the second projecting portion 82, the third projecting portion 83, and the fourth projecting portion 84 are provided in the first step portion 75. Grooves that are L-shaped when viewed from the tip end side in the axial direction are formed between the first projecting portion 81 and the second projecting portion 82, between the second projecting portion 82 and the third projecting portion 83, between the third projecting portion 83 and the fourth projecting portion 84, and between the fourth projecting portion 84 and the first projecting portion 81, and each groove forms a portion of one of the stepped grooves 57.

Further, as shown in FIG. 12, a cutting tip seat 85, which is formed in a rectangular shape, is provided as a recessed area in an inner face of the second projecting portion 82, facing one of the stepped grooves 57. A cutting tip seat (not shown in the drawings), which is formed in a rectangular shape, is provided as a recessed area in an inner face of the fourth projecting portion 84, facing one of the stepped grooves 57.

Another square tip 92, which is formed in a square shape, is fitted into the cutting tip seat 85 that is provided as the recessed area in the second projecting portion 82, and is secured by another bolt 97 (refer to FIG. 13). Another square tip 92 (refer to FIG. 14) is fitted into the cutting tip seat (not shown in the drawings) that is provided as the recessed area in the fourth projecting portion 84, and is by a bolt (not shown in the drawings). At this time, each of the square tips 92 is disposed such that one of its four corner portions is positioned toward the outer side of the tool body 73 in the radial direction.

Figure 15:
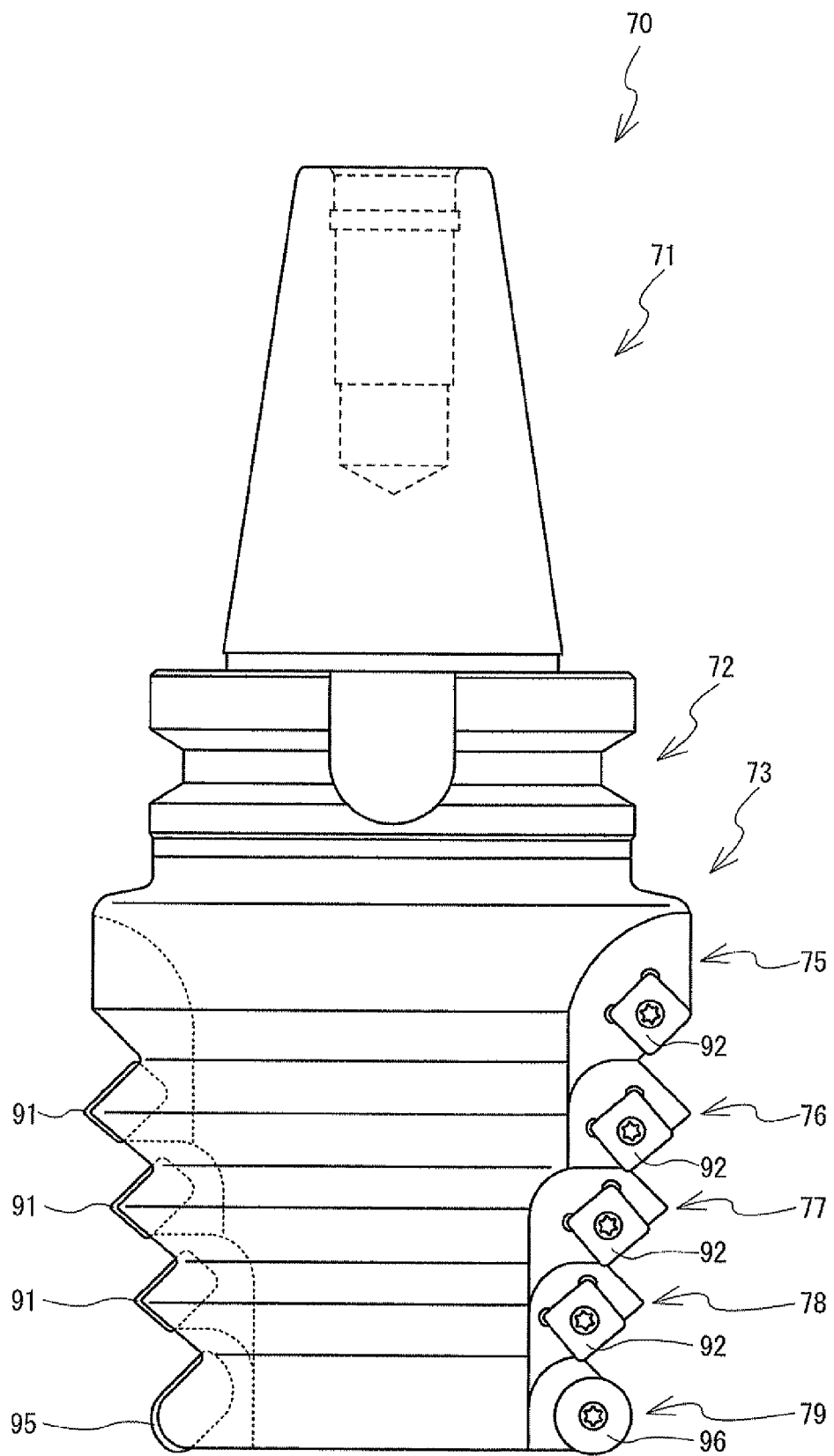
FIG. 15 is a figure that shows positional relationships among rectangular tips 91, square tips 92, a seed-shaped tip 95, and a circular tip 96, in the axial direction of the semi-finishing cutter 70.

Next, the positional relationships among the rectangular tips 91, the square tips 92, the seed-shaped tips 95, and the circular tips 96 in the axial direction of the semi-finishing cutter 70 will be explained. First, as shown in FIG. 15, in the first step portion 75, the square tip 92 that is fastened in the second projecting portion 82 and the square tip 92 that is fastened in the fourth projecting portion 84 are disposed on the same level in the axial direction.

Further, in each of the second step portion 76 to the fourth step portion 78, the rectangular tips 91 that are fastened in the first projecting portions 81 and the third projecting portions 83 are arranged in a staggered pattern in the axial direction in relation to the square tips 92 that are fastened in the second projecting portions 82 and the fourth projecting portions 84. In the fifth step portion 79, the circular tips 96 that are fastened in the first projecting portion 81 and the third projecting portion 83 and the seed-shaped tips 95 that are fastened in the second projecting portion 82 and the fourth projecting portion 84 are arranged such that a circular arc portion of one of the circular tips 96 overlaps a circular arc portion of one of the seed-shaped tips 95.

Figure 16:
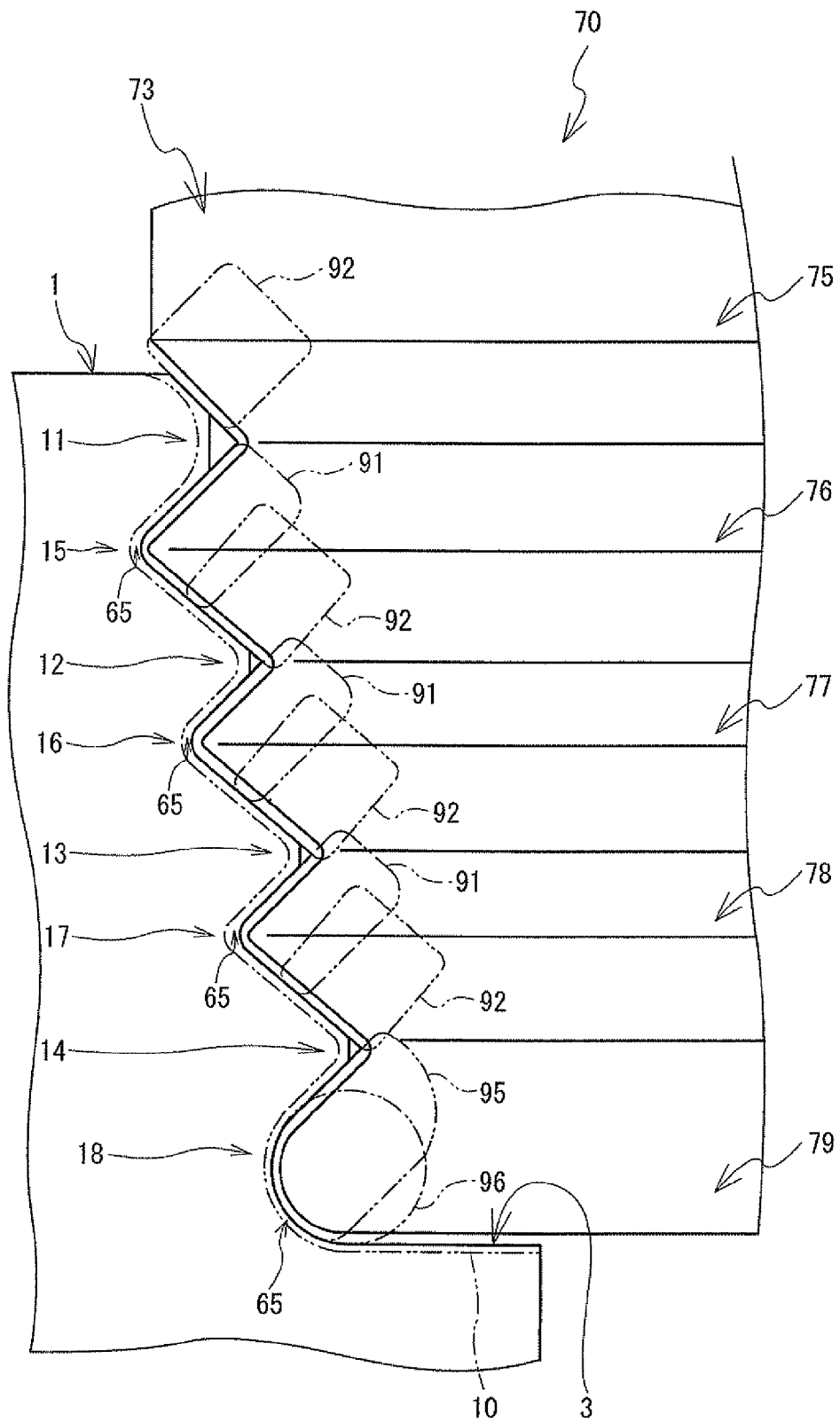
FIG. 16 is a figure that shows a relationship between a semi-finished shape 3 that is formed in the blade root 1 and movement paths of the rectangular tips 91, the square tips 92, the seed-shaped tip 95, and the circular tip 96 in step portions 75 to 79.

Next, the method by which the semi-finished shape 3 is cut in accordance with the paths in which the rectangular tips 91 travel, the paths in which the square tips 92 travel, the paths in which the seed-shaped tips 95 travel, and the paths in which the circular tips 96 travel will be explained with reference to FIG. 16. FIG. 16 shows the paths in which each of the tips 91, 92, 95, and 96 travels as viewed in an axial direction cross section of the tool body 73. The back end side of the tool body 73 in the axial direction is the upper side, and the tip end side in the axial direction is the lower side. First, as shown in FIG. 16, in the first step portion 75, a cutting path is formed in the rotation path of each of the square tips 92 by a side on a lower side of a corner portion that projects outward in the radial direction. A back end side of the first wide portion 11 of the planned blade root shape 10 is cut along the cutting path such that the specified cutting allowance 65 is left.

Further, in the second step portion 76, a V-shaped cutting path is formed by a corner portion that projects outward in the radial direction in the rotation path of each of the rectangular tips 91, by the two sides that flank the corner portion, and by a side on a lower side of a corner portion of each of the square tips 92 which projects outward in the radial direction. The first narrow portion 15 is cut along the V-shaped cutting path such that the specified cutting allowance 65 is left.

In the third step portion 77 as well, a V-shaped cutting path is formed by a corner portion that projects outward in the radial direction in the rotation path of each of the rectangular tips 91, by the two sides that flank the corner portion, and by a side on a lower side of a corner portion of each of the square tips 92 which projects outward in the radial direction. The second narrow portion 16 is cut along the V-shaped cutting path such that the specified cutting allowance 65 is left.

In the fourth step portion 78 as well, a V-shaped cutting path is formed by a corner portion that projects outward in the radial direction in the rotation path of each of the rectangular tips 91, by the two sides that flank the corner portion, and by a side on a lower side of a corner portion of each of the square tips 92 which projects outward in the radial direction. The third narrow portion 17 is cut along the V-shaped cutting path such that the specified cutting allowance 65 is left.

Furthermore, in the fifth step portion 79, a circular arc-shaped cutting path is formed by one of the circular arc portions in each of the seed-shaped tips 95, by one of the sides that extends from the circular arc portion, and by a circular arc portion in the rotation path of each of the circular tips 96. The fourth narrow portion 18 is cut along the circular arc-shaped cutting path such that the specified cutting allowance 65 is left.

Thus, in the semi-finishing cutter 70, the rectangular tips 91 and the square tips 92 are disposed in a staggered pattern in the second to the fourth step portions 76 to 78. In contrast to a single cutting edge that is formed in each step portion of a known high-speed type semi-finishing cutter, in the semi-finishing cutter 70, a single cutting edge is formed by each pair of one of the rectangular tips 91 and the square tips 92. In other words, in each of the second to the fourth step portions 76 to 78, the four tips are disposed in a staggered pattern, so that two cutting edges are formed. In the known high-speed type semi-finishing cutter, a large number of cutting edges (for example, six cutting edges) must be provided in order to cut the semi-finished shape, which has a complex shape.

Accordingly, disposing each pair of one of the rectangular tips 91 and one of the square tips 92 in a staggered pattern, as in the semi-finishing cutter 70, makes it possible to effectively reduce the frequency of contact with the outer side face of the blade root 1. Because this makes it possible to reduce the load that is borne by the blade root 1, the speed of the cutting by the semi-finishing cutter 70 may be increased, so the cutting feed may be made faster. Therefore, the work of the semi-finishing process may be performed efficiently.

Further, a portion that corresponds to the fourth narrow portion 18 of the planned blade root shape 10 is cut by the two seed-shaped tips 95 and the two circular tips 96 that are fastened to the fifth step portion 79 of the semi-finishing cutter 70. The four tips are disposed on the same level in the axial direction. In other words, in contrast to the two cutting edges that are formed in the second to the fourth step portions 76 to 78, four cutting edges are formed in the fifth step portion 79. Using a greater number of cutting edges for a portion such as the fourth narrow portion 18, where a greater amount of cutting is done than in other locations, makes it possible to achieve more stable machining.

Furthermore, the rectangular tips 91 and the square tips 92 that are used in the semi-finishing cutter 70, like the tips that are used in the rough cutting cutter 20 that is described above, have simple shapes, so known commercially available throw-away tips may be used. In other words, it is not necessary to manufacture a tip with a new shape in order to use the semi-finishing cutter 70, so it is possible to provide the semi-finishing cutter 70 in an easy-to-use form without increasing the cost.

In the semi-finishing process, because the first wide portion 11, the second wide portion 12, the third wide portion 13, and the fourth wide portion 14 of the planned blade root shape 10 have already been cut in the rough cutting process, with the exception of the wide portions, the cutting is done for the first narrow portion 15, the second narrow portion 16, the third narrow portion 17, and the fourth narrow portion 18 such that the specified cutting allowances 65 are left. Moreover, the portions of the tool body 73 that correspond to the first wide portion 11, the second wide portion 12, the third wide portion 13, and the fourth wide portion 14 are made narrower in the radial direction and do not come into contact with the outer side face of the blade root 1, because the wide portions have already been cut.

This means that an excessive load does not bear on the narrower portions, which are weaker than other portions of the semi-finishing cutter 70. Accordingly, the cutting feed of the semi-finishing cutter 70 may be made faster, so the semi-finished shape 3 may be cut efficiently. Furthermore, because an excessive load does not bear on the narrower portions, the chatter noise and vibration that arise during machining may be suppressed, and there may be no concern that the tool might break during the cutting. Thus, using the semi-finishing cutter 70 makes it possible to perform the cutting for all portions of the planned blade root shape 10 on the blade root 1 that has been formed into the rough cut shape 2, such that the semi-finished shape 3 may be cut efficiently, with the specified cutting allowances 65 being left.

Figure 17:
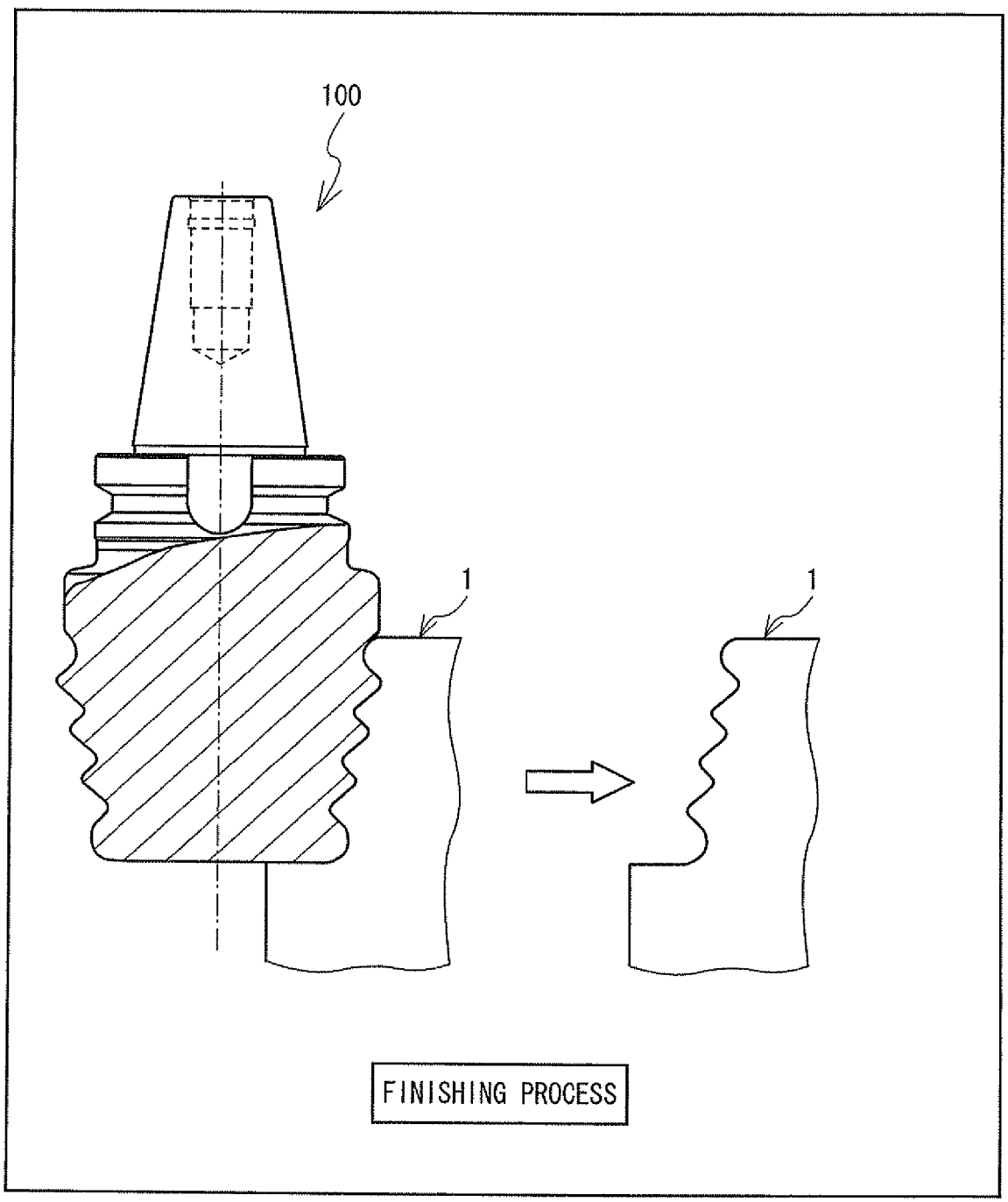
FIG. 17 is a figure that shows the content of a finishing process.

Next, the finishing process (S12) will be explained. As shown in FIG. 17, a finishing cutter 100 that has an upside-down Christmas tree shape is used to cut the semi-finished shape 3 such that the specified cutting allowances 65 are removed from the semi-finished shape 3 that was cut in the blade root 1 in the semi-finishing process. Thus, the cutting processes for the blade root 1 are completed.

As explained above, the blade root cutting processes for cutting the blade root 1 are configured from the three processes of the rough cutting process, the semi-finishing process, and the finishing process. In the rough cutting process, the rough cut shape 2 is cut in the blade root 1 using the throwaway type rough cutting cutter 20. The cutting of the rough cut shape 2 may be done such that the specified cutting allowances 65 are left in the first wide portion 11, the second wide portion 12, the third wide portion 13, and the fourth wide portion 14 of the planned blade root shape 10. Next, in the semi-finishing process, the semi-finished shape 3 is cut in the blade root 1 using the semi-finishing cutter 70 according to the present embodiment. In the same manner as the rough cutting cutter 20, the semi-finishing cutter 70 is a throwaway rotary cutting tool. The semi-finishing cutter 70 is provided with a tool body 73 that becomes narrower in a stepped shape. The tool body 73 is configured from the first to the fifth step portions 75 to 79.

Each of the step portions is provided with an even number of the recessed tip seats around its circumference, and the tip seats are disposed in a staggered pattern in the axial direction.

For example, the rectangular tips 91 and the square tips 92 are fitted alternately in the circumferential direction into the tip seats in each of the second to the fourth step portions 76 to 78, and are fastened. A pair of one of the rectangular tips 91 and one of the square tips 92 forms a cutting edge, so two cutting edges are formed in each of the second to the fourth step portions 76 to 78. The frequency of contact with the outer side face of the blade root 1 may therefore be effectively reduced, so the load that is borne by the blade root 1 may be reduced.

Accordingly, the cutting speed of the semi-finishing cutter 70 may be increased and the cutting feed may be made faster, so the work in the semi-finishing process may be performed efficiently. Furthermore, the rectangular tips 91 and the square tips 92 that are used in the semi-finishing cutter 70 have simple shapes, so known commercially available throwaway tips may be used. Therefore, it is possible to provide the semi-finishing cutter 70 in an easy-to-use form without increasing the cost.

The rough cut shape 2 may be cut using the rough cutting cutter 20. In the rough cut shape 2, the first wide portion 11, the second wide portion 12, the third wide portion 13, and the fourth wide portion 14 of the planned blade root shape 10 have already been cut such that the cutting allowances 65 have been left. Accordingly, in the semi-finishing process that is the next process, it is not necessary to cut the portions that correspond to the first wide portion 11, the second wide portion 12, the third wide portion 13, and the fourth wide portion 14. In the semi-finishing process, the semi-finishing cutter 70 that is formed into an upside-down Christmas tree shape is used, and the portions that are narrower in the radial direction, which are weaker than the other portions, correspond to the first wide portion 11, the second wide portion 12, the third wide portion 13, and the fourth wide portion 14, which have already been cut such that the cutting allowances 65 are left. In other words, the narrower portions of the semi-finishing cutter 70 do not come into contact with the outer side face of the blade root 1, so it is possible to prevent an excessive load from bearing on the semi-finishing cutter 70. The cutting feed for the semi-finishing cutter 70 may be made faster, so the semi-finished shape 3 may be cut efficiently. Furthermore, because an excessive load does not bear on the narrower portions, the chatter noise and vibration that arise during machining may be suppressed, and there may be no concern that the tool might break during the cutting.

Next, in order to confirm the effect of using the semi-finishing cutter 70, a comparison was made of a case in which the semi-finishing cutter 70 (tool A) was used in the semi-finishing process and a case in which a known high-speed type semi-finishing cutter (tool B) was used. In this comparison test, the cutting feed in the case where the throwaway type tool A was used and the cutting feed in the case where the known high-speed type tool B was used were measured and evaluated. The conditions for each of the tools (the diameter and the number of cutting edges) and the cutting conditions (the cutting speed, the feed per cutting edge, and the revolution speed) are shown in Table 1 below.

TABLE 1

| | Diameter | Number of Cutting Edges | Cutting Speed | Feed per Cutting Edge | Revolution Speed | Cutting Feed |
|---|---|---|---|---|---|---|
| Unit | mm | Number | mm/min | mm/edge | $min^{-1}$ | mm/min |
| Tool A | 100 | 2 | 150 | 0.08 | 477.5 | 76.4 |
| Tool B | 100 | 8 | 20 | 0.02 | 63.7 | 10.2 |

Specifically, the settings for the tool A were that the diameter was 100.0 millimeters, the number of cutting edges was two, the cutting speed was 150 millimeters per minute, the feed per cutting edge was 0.08 millimeters per edge, and the revolution speed was 477.5 $min^{-1}$. On the other hand, the settings for the tool B were that the diameter was 100.0 millimeters, the number of cutting edges was eight, the cutting speed was 20 millimeters per minute, the feed per cutting edge was 0.02 millimeters per edge, and the revolution speed was 63.7 $min^{-1}$. With respect to the number of cutting edges for the semi-finishing cutter 70 that is the tool A, as described above, the two types of tips are disposed in a staggered pattern, so the number of the cutting edges that come into contact with and cut the outer side face of the blade root 1 is two.

Figure 18:
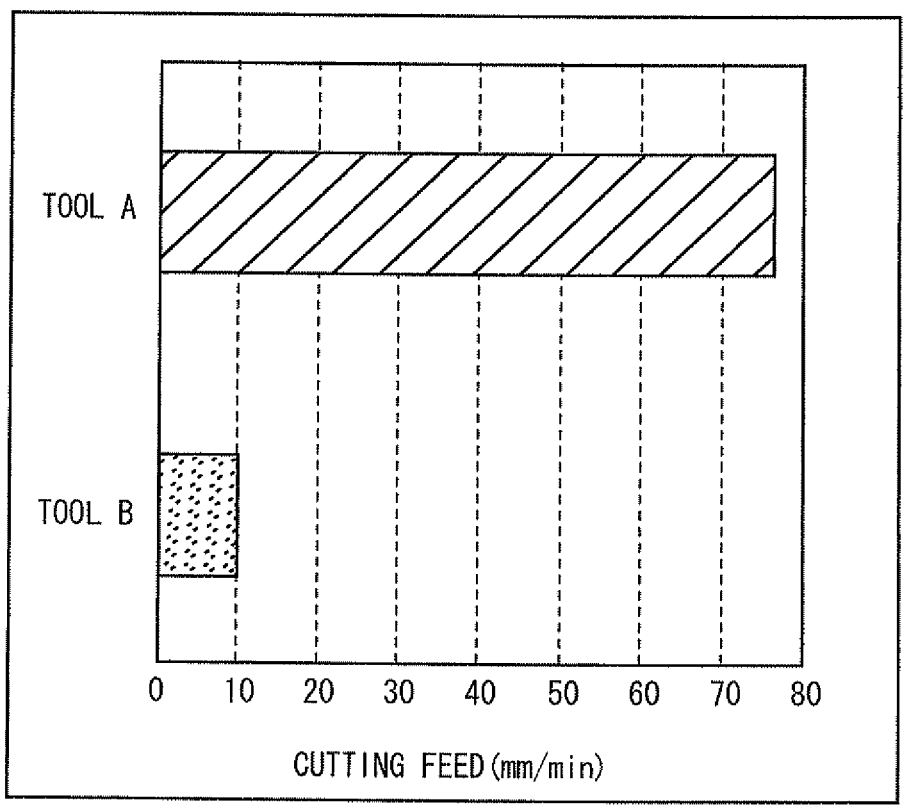
FIG. 18 is a graph that shows results of an evaluation test.

As shown in FIG. 18 and Table 1, in a case where the tool B was used, the eight cutting edges came into contact with the work material to cut the complex semi-finished shape 3, so the cutting speed and the revolution speed may not be increased. Accordingly, the cutting feed in a case where the tool B was used was 10.2 millimeters per minute. In contrast, in a case where the tool A was used, only the two cutting edges came into contact with the work material, so the shock that was imparted from the work material could be reduced, making it possible to make the cutting speed and the revolution speed faster than for the tool B. Thus, the cutting feed was 76.4 millimeters per minute in a case where the tool A was used, which was dramatically faster than with the tool B. These results verify that the semi-finished shape 3 of the blade root 1 may be cut efficiently by using the tool A.

In the embodiment that is described above, the semi-finishing cutter 70 that is "the throwaway rotary cutting tool" according to the present disclosure may be, for example, one of an end mill and a side cutter.

It is obvious that various types of modifications may be made to the present disclosure. For example, in the embodiment that is described above, the semi-finishing cutter 70 is provided with the tool body 73 that includes the first to the fifth step portions 75 to 79, but the number of the step portions is not limited to five and may be adjusted in accordance with a contour of a blade root to be formed.

Further, in the rough cutting process, all of the wide portions, that is, the first wide portion 11, the second wide portion 12, the third wide portion 13, and the fourth wide portion 14, are cut first, with the specified cutting allowances 65 being left, but at least the wide portion at the tip end, where the width of the root is extremely narrow, may be cut.

INDUSTRIAL APPLICABILITY

The throwaway rotary cutting tool according to the present disclosure is not limited to a case where the blade root of a turbine blade is cut and may be applied in any case where the shape of a tree-shaped base portion is cut.

The invention claimed is:

1. A throwaway rotary cutting tool that is used for performing semi-finishing of a blade root of a turbine blade that is to be mounted on an outer circumference of a rotor, the blade root being machined such that the blade root is bilaterally symmetrical with respect to a longitudinal direction of the blade root, the blade root gradually becomes narrower towards a tip end, and a width of the blade root increases and decreases, the throwaway rotary cutting tool comprising:
a tool body that rotates about an axis, whose diameter becomes narrower in a stepped manner towards a tip end of the tool body in an axial direction, and that includes on a side face of the tool body a plurality of step portions;
first tip seats that are even in number, and that are provided as recessed areas on an outer circumference of and in a circumferential direction of a step portion at a tip end side of the tool body in the axial direction; and
second tip seats that are even in number, that are provided as recessed areas in a staggered pattern in the axial direction, and that are formed on an outer circumference of and in a circumferential direction of a step portion that is disposed farther toward a back end than the step portion at the tip end side of the tool body,
wherein:
a first tip having a total of four sides where the four sides are two rectilinear sides that are parallel to each other and two circular arc sides disposed at opposite ends of the rectilinear sides to directly connect the rectilinear sides to each other, the first tip being fitted into at least one of the first tip seats, and fastened,
a second tip that is rectangular and a third tip that is rectangular are fitted into the second tip seats alternately in the circumferential direction of the tool body, and fastened,
the first tip is disposed such that one of the circular arc sides is positioned toward an outer side of the tool body in a radial direction and the rectilinear sides are oriented obliquely in relation to the axial direction in an intersecting manner,
the second tip is disposed such that a corner portion of the second tip is positioned toward the outer side of the tool body in the radial direction,
the third tip is disposed such that the third tip is closer to a center of the tool body in the radial direction than the second tip and is offset to the tip end, and a corner portion of the third tip is positioned toward the outer side of the tool body in the radial direction,
an arc-shaped cutting path is to be formed by the one of the circular arc sides of the first tip and by a side that is continuous with one end of the one of the circular arc sides, and
a V-shaped cutting path is to be formed by the corner portion of the second tip that is positioned toward the outer side in the radial direction and by one of two sides that flank the corner portion of the third tip that is positioned toward the outer side in the radial direction.

2. The throwaway rotary cutting tool according to claim 1, wherein the first tip and a fourth tip that is disk-shaped are fitted alternately in the circumferential direction of the tool body into the first tip seats that are even in number, and fastened.

3. The throwaway rotary cutting tool according to claim 2, wherein:
the first tip, the second tip, the third tip, and the fourth tip configure a right-hand cut in the respective step portions, and
grooves that are formed between the first tip seats and between the second tip seats are left-hand helices.

4. The throwaway rotary cutting tool according to claim 1, wherein the second tip has a non-square rectangular shape and the third tip has a square shape.

* * * * *